(12) United States Patent
Caballero et al.

(10) Patent No.: US 7,747,518 B2
(45) Date of Patent: *Jun. 29, 2010

(54) COMPUTER SYSTEM FOR CONTROLLING A SYSTEM OF MANAGING FLUCTUATING CASH FLOWS

(75) Inventors: Crispina O. Caballero, Stouffville (CA); Thomas F. Conroy, Englewood, CO (US); Steven A. Eisenberg, Atlanta, GA (US); Brian G. Holland, Needham, MA (US); Stephen F. Kraysler, Hull, MA (US); Richard W. Mann, Greensboro, NC (US)

(73) Assignee: Mann Conroy Eisenberg & Associates, Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/569,987

(22) PCT Filed: Oct. 1, 2004

(86) PCT No.: PCT/US2004/032640

§ 371 (c)(1), (2), (4) Date: Nov. 16, 2006

(87) PCT Pub. No.: WO2005/040979

PCT Pub. Date: May 6, 2005

(65) Prior Publication Data

US 2007/0162380 A1 Jul. 12, 2007

(51) Int. Cl.
*G06Q 40/00* (2006.01)
(52) U.S. Cl. .................................................... 705/38
(58) Field of Classification Search .................. 705/38
See application file for complete search history.

(56) References Cited

U.S. PATENT DOCUMENTS 4,837,693 A    6/1989   Schotz ...................... 364/408

(Continued)

FOREIGN PATENT DOCUMENTS

AU      2004284764       7/2009

(Continued)

OTHER PUBLICATIONS

Greenbaum et al.: Swap it! Variable M&E revenue for fixedM&E revenue, Feb. 2002, Society of Actuaries, No. 38, pp. 21-23.*

(Continued)

*Primary Examiner*—Hani Kazimi
*Assistant Examiner*—Bijendra K Shrestha
(74) *Attorney, Agent, or Firm*—Peter K. Trzyna, Esq.

(57) ABSTRACT

Apparatus (method implemented with a machine, the machine, and the method for making the machine, and products produced thereby) for controlling a system of managing cash flows for a transaction, the apparatus including: data processing means arranged for receiving information into memory, said information including respective descriptions of risks, statistical assumptions for said risks, and financial assumptions for said risks, the data processing means further including: calculating means, responsive to said descriptions and said assumptions, for calculating expected cash flows corresponding to said risks for time periods; accounting means for determining, responsive to actual cash flow information from occurrence of events corresponding to said risks, for a first party to the transaction owing the expected cash flows to a second party to the transaction, and for determining, for the second party owing the actual cash flows to the first party, a net settlement, for each of said time periods, between the parties in the transaction, to manage the actual cash flows and the expected cash flows.

118 Claims, 21 Drawing Sheets

U.S. PATENT DOCUMENTS

| | | | |
|---|---|---|---|
| 4,839,804 A * | 6/1989 | Roberts et al. | 705/36 R |
| 4,969,094 A | 11/1990 | Halley et al. | |
| 5,083,270 A | 1/1992 | Gross et al. | 364/408 |
| 5,136,502 A | 8/1992 | Van Remortel et al. | 364/413.01 |
| 5,590,037 A * | 12/1996 | Ryan et al. | 705/4 |
| 5,592,379 A | 1/1997 | Finfrock et al. | 395/239 |
| 5,754,980 A | 5/1998 | Anderson et al. | 705/14 |
| 5,806,042 A | 9/1998 | Kelly et al. | 705/4 |
| 5,812,988 A * | 9/1998 | Sandretto | 705/36 R |
| 5,884,274 A * | 3/1999 | Walker et al. | 705/4 |
| 5,907,828 A * | 5/1999 | Meyer et al. | 705/4 |
| 5,913,198 A | 6/1999 | Banks | 705/36 R |
| 5,926,800 A | 7/1999 | Baronowski et al. | 705/35 |
| 5,970,479 A | 10/1999 | Shepherd | 705/37 |
| 5,974,390 A | 10/1999 | Ross | 705/4 |
| 6,026,364 A | 2/2000 | Whitworth | 705/4 |
| 6,049,772 A | 4/2000 | Payne et al. | 705/4 |
| 6,076,074 A * | 6/2000 | Cotton et al. | 705/40 |
| 6,138,102 A | 10/2000 | Hinckley, Jr. | 705/4 |
| 6,154,730 A | 11/2000 | Adams et al. | 705/36 R |
| 6,304,858 B1 * | 10/2001 | Mosler et al. | 705/37 |
| 6,321,212 B1 | 11/2001 | Lange | 705/37 |
| 6,330,541 B1 * | 12/2001 | Meyer et al. | 705/36 R |
| 6,393,405 B1 | 5/2002 | Vicente | 705/4 |
| 6,456,979 B1 | 9/2002 | Flagg | 705/4 |
| 6,604,080 B1 | 8/2003 | Kern | 705/4 |
| 6,999,935 B2 | 2/2006 | Parankirinathan | 705/4 |
| 7,024,386 B1 * | 4/2006 | Mills et al. | 705/39 |
| 7,558,757 B2 | 7/2009 | Conroy et al. | |
| 2001/0047325 A1 | 11/2001 | Livingston | 705/38 |
| 2002/0046143 A1 | 4/2002 | Eder | 705/36 |
| 2002/0133448 A1 | 9/2002 | McGarry et al. | 705/37 |
| 2002/0147670 A1 | 10/2002 | Lange | 705/35 |
| 2002/0156658 A1 | 10/2002 | Selesny et al. | 705/4 |
| 2002/0178111 A1 | 11/2002 | Woodley | 705/38 |
| 2003/0074232 A1 | 4/2003 | Lee | 705/4 |
| 2003/0083972 A1 | 5/2003 | Williams | 705/36 |
| 2003/0083975 A1 | 5/2003 | O'Grady et al. | 705/37 |
| 2003/0088430 A1 | 5/2003 | Ruark | 705/1 |
| 2003/0093304 A1 | 5/2003 | Keller et al. | 705/4 |
| 2003/0093354 A1 | 5/2003 | Marshall | 705/36 |
| 2003/0115128 A1 | 6/2003 | Lange et al. | 705/37 |
| 2003/0144888 A1 | 7/2003 | Baron et al. | 705/4 |
| 2003/0144947 A1 | 7/2003 | Payne | 705/37 |
| 2003/0204462 A1 | 10/2003 | Eisler | 705/36 |
| 2003/0208385 A1 | 11/2003 | Zander et al. | 705/4 |
| 2004/0010426 A1 | 1/2004 | Berdou | 705/4 |
| 2004/0024692 A1 * | 2/2004 | Turbeville et al. | 705/38 |
| 2004/0030589 A1 | 2/2004 | Leisher et al. | 705/4 |
| 2004/0088201 A1 | 5/2004 | Lang | 705/4 |
| 2004/0167812 A1 | 8/2004 | Haney, II | 705/8 |
| 2004/0177021 A1 | 9/2004 | Carlson et al. | 705/36 |
| 2004/0177022 A1 | 9/2004 | Williams et al. | 705/36 |
| 2004/0181436 A1 | 9/2004 | Lange | 705/4 |
| 2005/0027645 A1 | 2/2005 | Lui et al. | 705/38 |
| 2005/0044034 A1 | 2/2005 | Perry et al. | 705/37 |
| 2005/0055250 A1 | 3/2005 | Kopold et al. | 705/4 |
| 2005/0060209 A1 | 3/2005 | Hill et al. | 705/4 |
| 2005/0071204 A1 | 3/2005 | Parankirinathan | 705/4 |
| 2005/0080653 A1 | 4/2005 | Stemple | 705/4 |
| 2005/0119919 A1 | 6/2005 | Eder | 705/4 |
| 2005/0182670 A1 | 8/2005 | Burgess | 705/4 |
| 2005/0261943 A1 | 11/2005 | Quarterman et al. | 705/4 |
| 2005/0267785 A1 | 12/2005 | Parankirinathan | 705/4 |
| 2005/0278198 A1 | 12/2005 | Huxol et al. | 705/4 |

FOREIGN PATENT DOCUMENTS

| | | |
|---|---|---|
| EP | 0 978 795 | 7/1999 |
| JP | 2004/110418 | 4/2004 |
| WO | 02/65248 | 2/2002 |
| WO | 2004/013794 | 2/2004 |

OTHER PUBLICATIONS

Committee on Payment and Settlement Systems of the central bank of the Grup of Ten countries: Real-Time Gross Settlement Systems, Mar. 1997, Bank for International Settlement, pp. 1-66.*

Amendment and Response for U.S. Appl. No. 11/847,241, filed Feb. 10, 2010. pp. 1-7.

Office Action for U.S. Appl. No. 11/847,241, mailed Aug. 19, 2009. pp. 1-20.

Office Action for Japanese Patent Application No. 535541/2006, mailed on Jan. 12, 2010. pp. 1-6.

"Notice of Grounds Rejection" for Japanese Patent Application No. 535541/2006, mailed on Dec. 8, 2009. pp. 1-5.

Canadian Office Action for Application No. 2,542,699, mailed Dec. 1, 2008. pp. 1-5.

Canadian Office Action for Application No. 2,542,699, mailed Apr. 1, 2008. pp. 1-3.

Canadian Office Action for Application No. 2,542,699, mailed Aug. 2, 2007. pp. 1-4.

Response to Canadian Office Action for Application No. 2,542,699, filed Feb. 4, 2008. pp. 1-46.

Response to Canadian Office Action for Application No. 2,542,699, filed Oct. 1, 2008. pp. 1-24.

Australian Office Action for Application No. 2004284764, mailed Aug. 30, 2007. pp. 1-3.

European Office Action for Application No. 04794112.5, mailed Jul. 23, 2007. pp. 1-5.

European Office Action for Application No. 04794112.5, mailed Jan. 18, 2007. pp. 1-3.

Response to Official Action for European Patent Application No. 04794112.5, filed Feb. 6, 2009. pp. 1-4.

Supplemental Response to Official Action for European Patent Application No. 04794112.5, filed Feb. 5, 2007. pp. 1-18.

Response to Official Action for European Patent Application No. 04794112.5, filed May 16, 2007. pp. 1-3.

Office Action for U.S. Appl. No. 10/687,063, mailed Jun. 16, 2008.

Office Action for U.S. Appl. No. 10/687,063, mailed Sep. 17, 2007.

Amendment and Response for U.S. Appl. No. 10/687,063, filed Sep. 9, 2008.

Specification and claims for U.S. Appl. No. 11/847,241, filed Aug. 29, 2007. pp. 1-17.

Gorvett R. W. "Insurance Securitization: The Development of a New Asset Class"; 1999 Casualty Actuarial Society "Securitization of Risk" Discussion Paper Program. pp. 1-40.

"Swiss Re obtains USD 255 million of catastrophic protection from innovative securitization structure"; Jul. 18, 2002 CET. pp. 1.

PCT International Search Report for PCT/US04/32640, filed Oct. 1, 2004. pp. 1-2.

PCT Written Opinion of the International Searching Authority for PCT/US04/32640, filed Oct. 1, 2004. pp. 1-4.

Japanese translation for "Notice of Grounds Rejection" for Japanese Patent Application No. 535541/2006, mailed on Dec. 8, 2009. pp. 1-3.

Notice of Allowance and Fee(s) Due for U.S. Appl. No. 10/687,063, mailed on May 8, 2009. pp. 1-148.

File History for U.S. Appl. No. 10/743,201.

File History for U.S. Appl. No. 60/507,170.

File History for U.S. Appl. No. 11/197,251.

"Office Action" for Canadian Patent Application No. 2,542,699, mailed on Oct. 1, 2009. pp. 1-4.

"Response to Official Action" for Canadian Patent Application Serial No. 2,542,699, filed on Mar. 31, 2010. pp. 1-4.

* cited by examiner

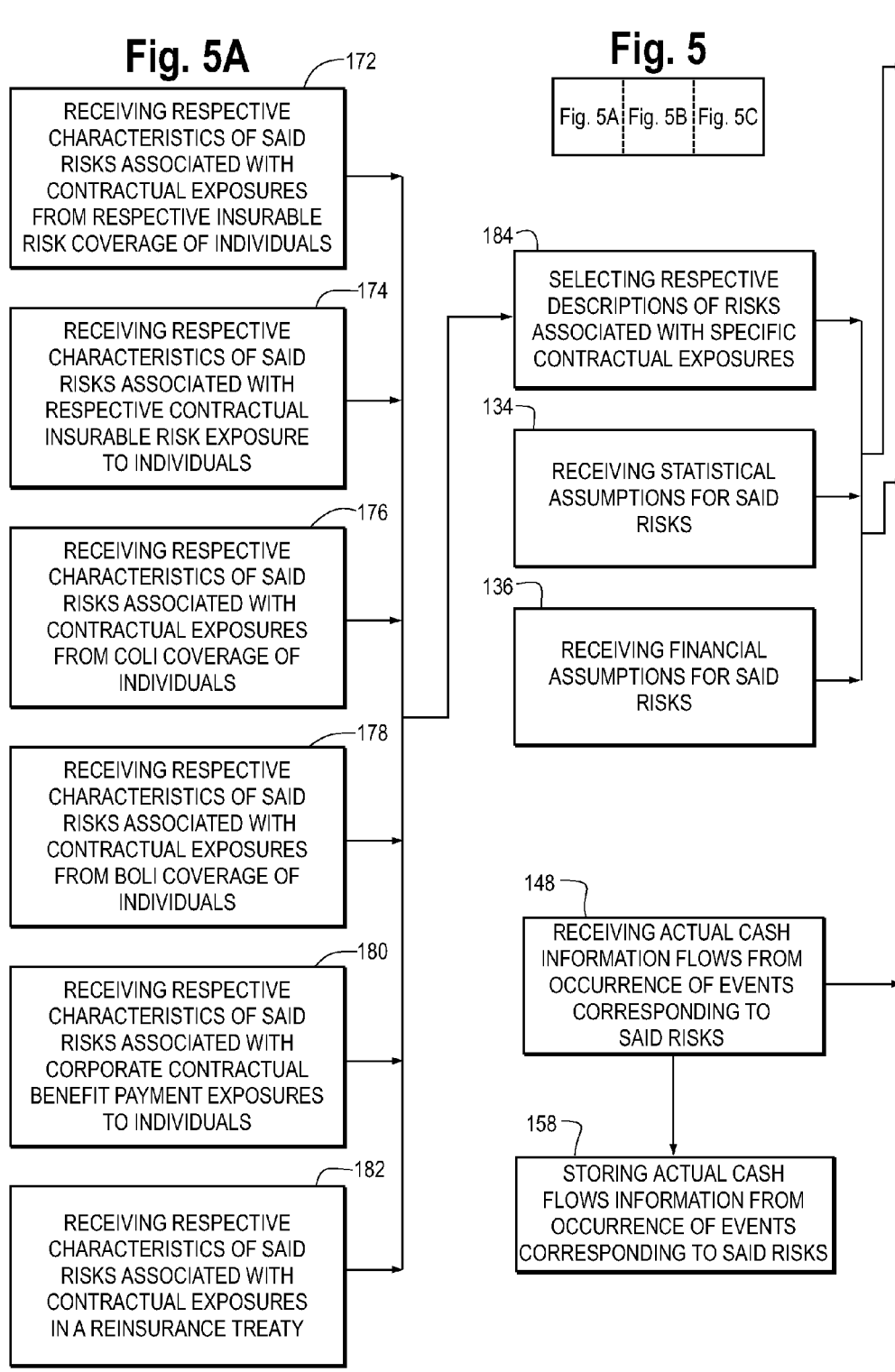

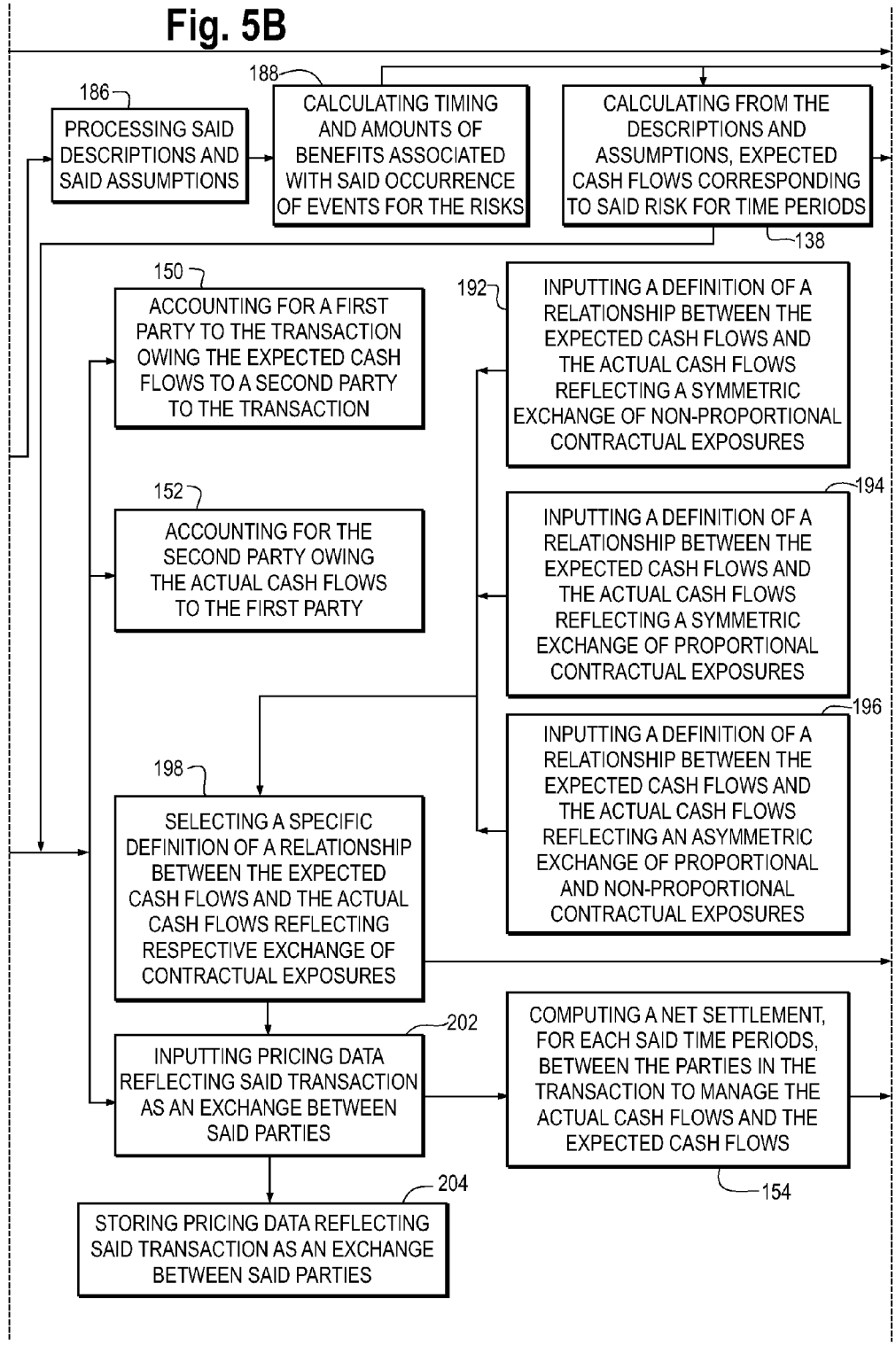

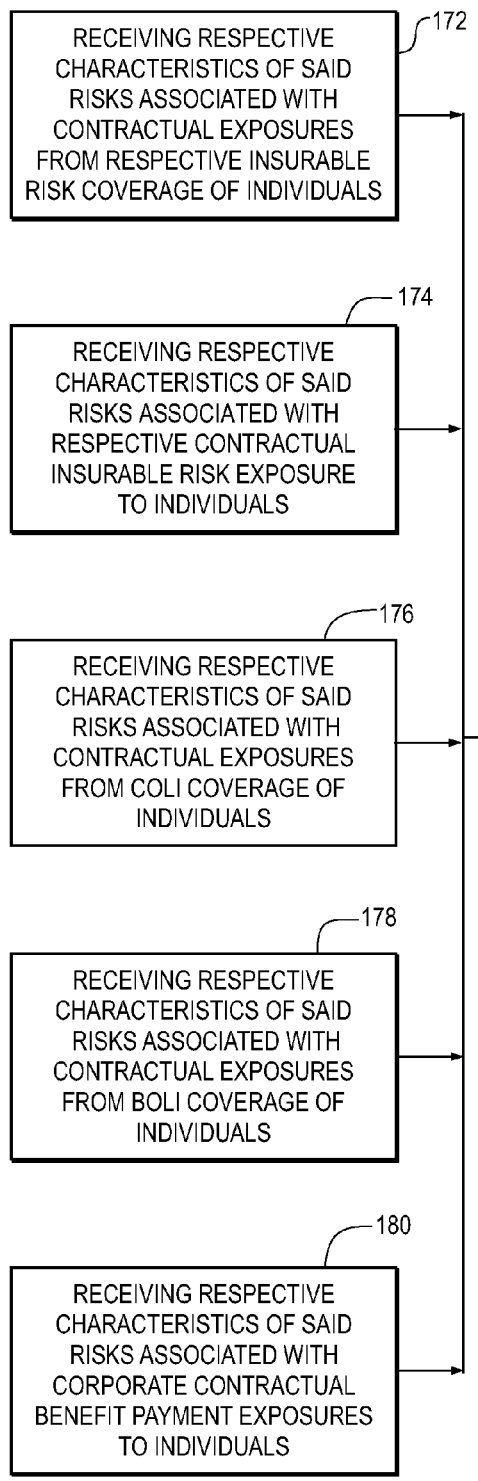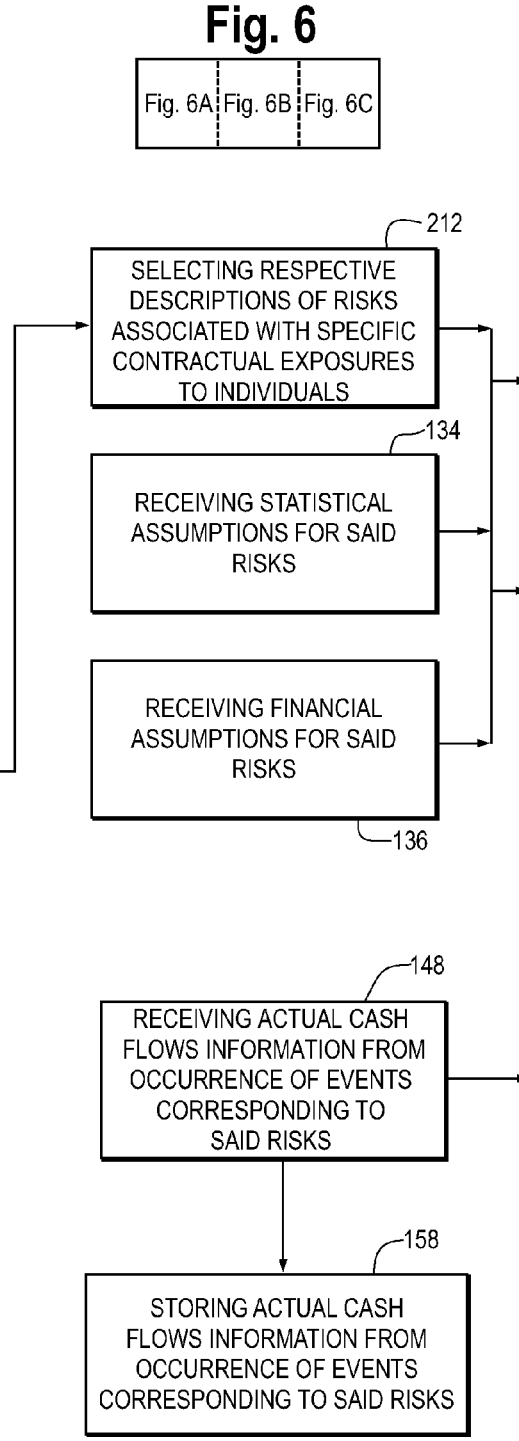

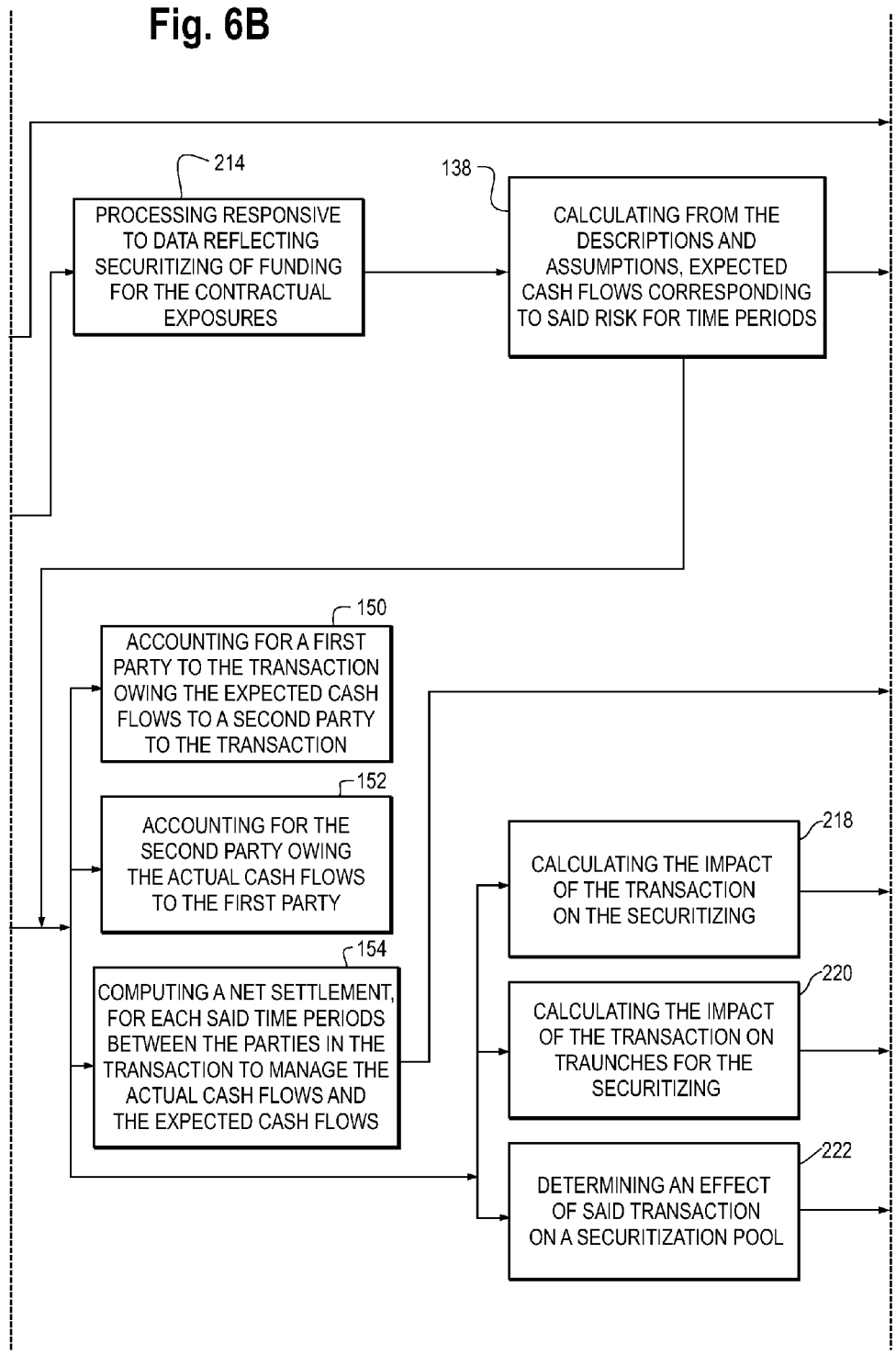

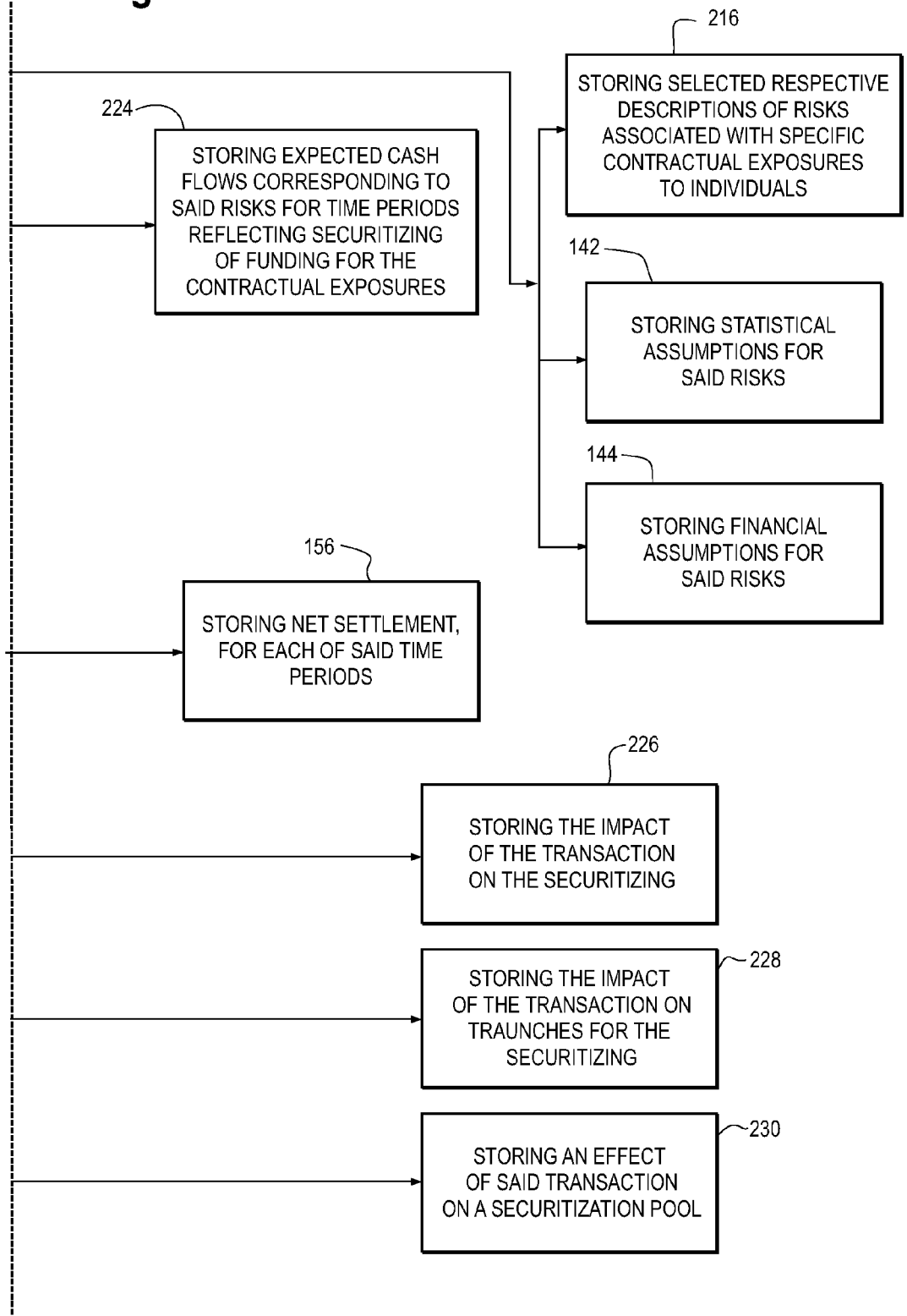

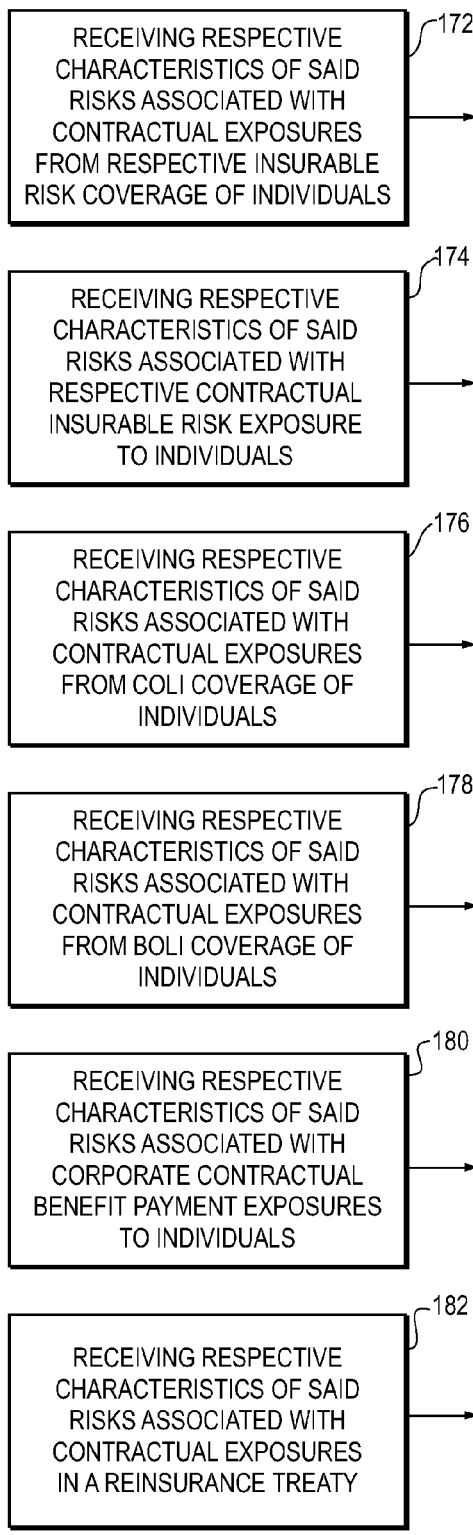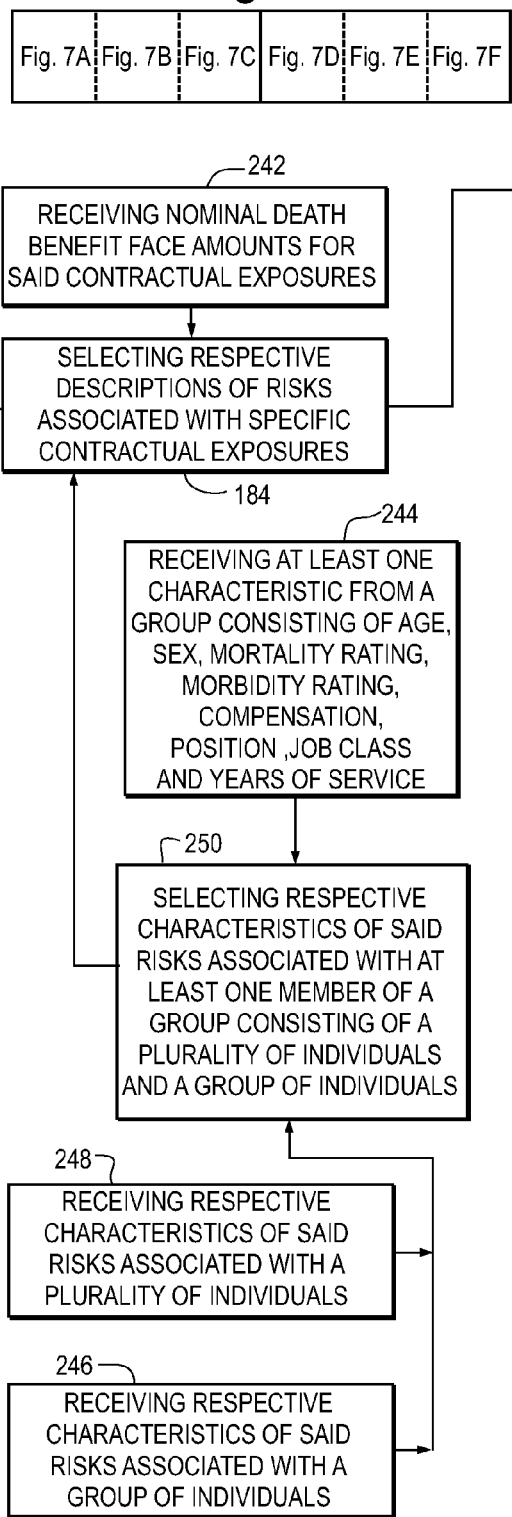

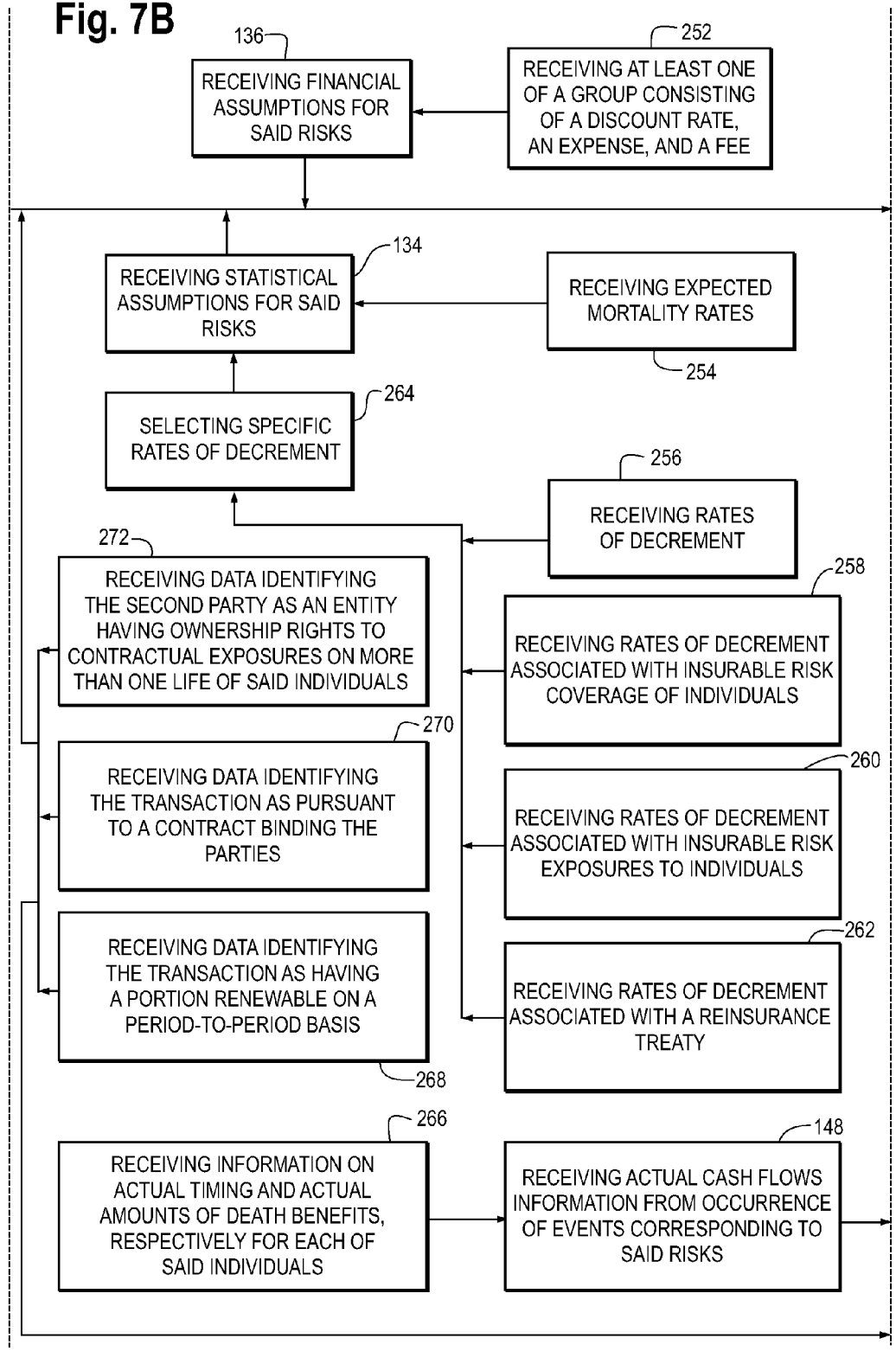

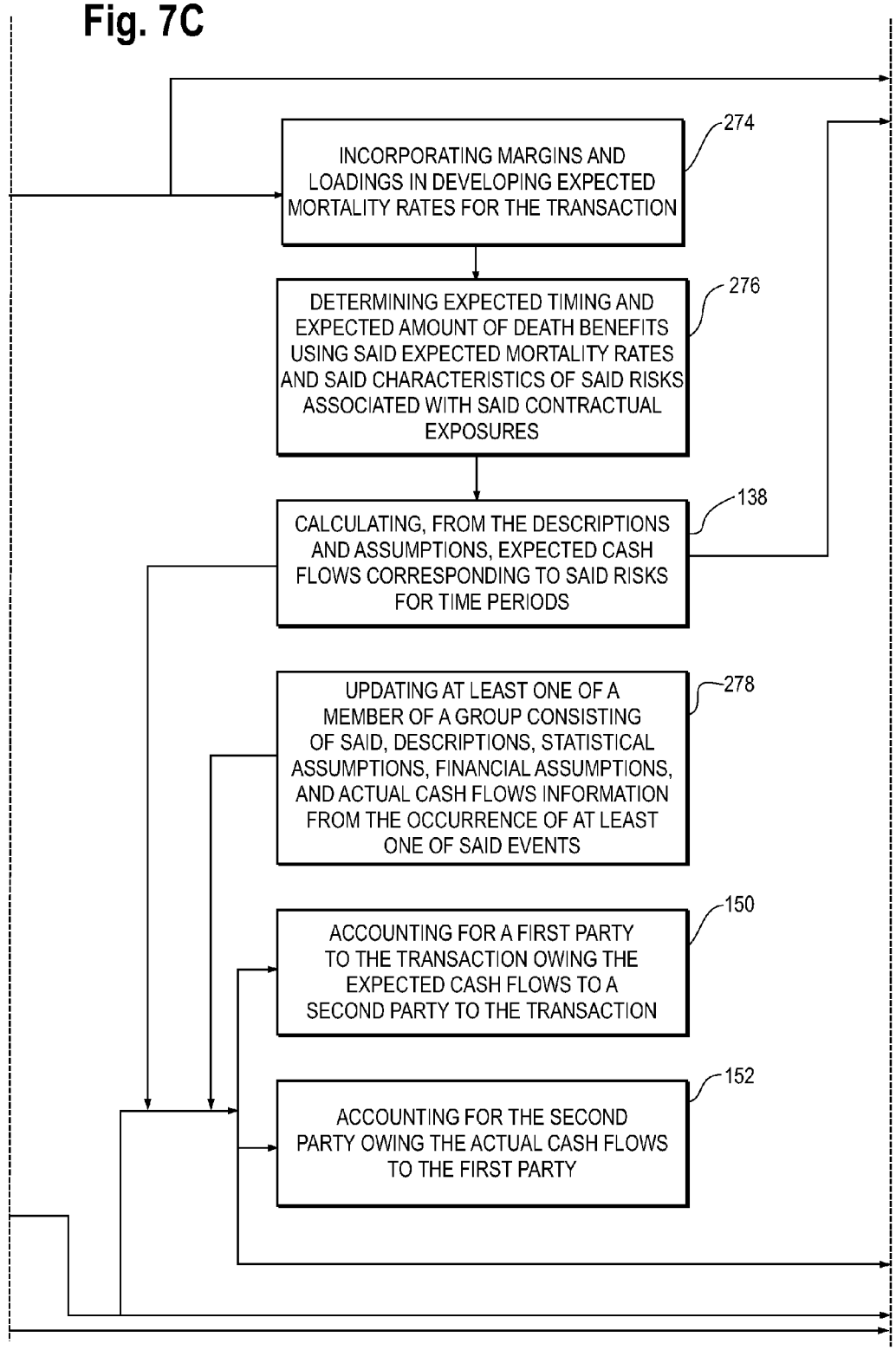

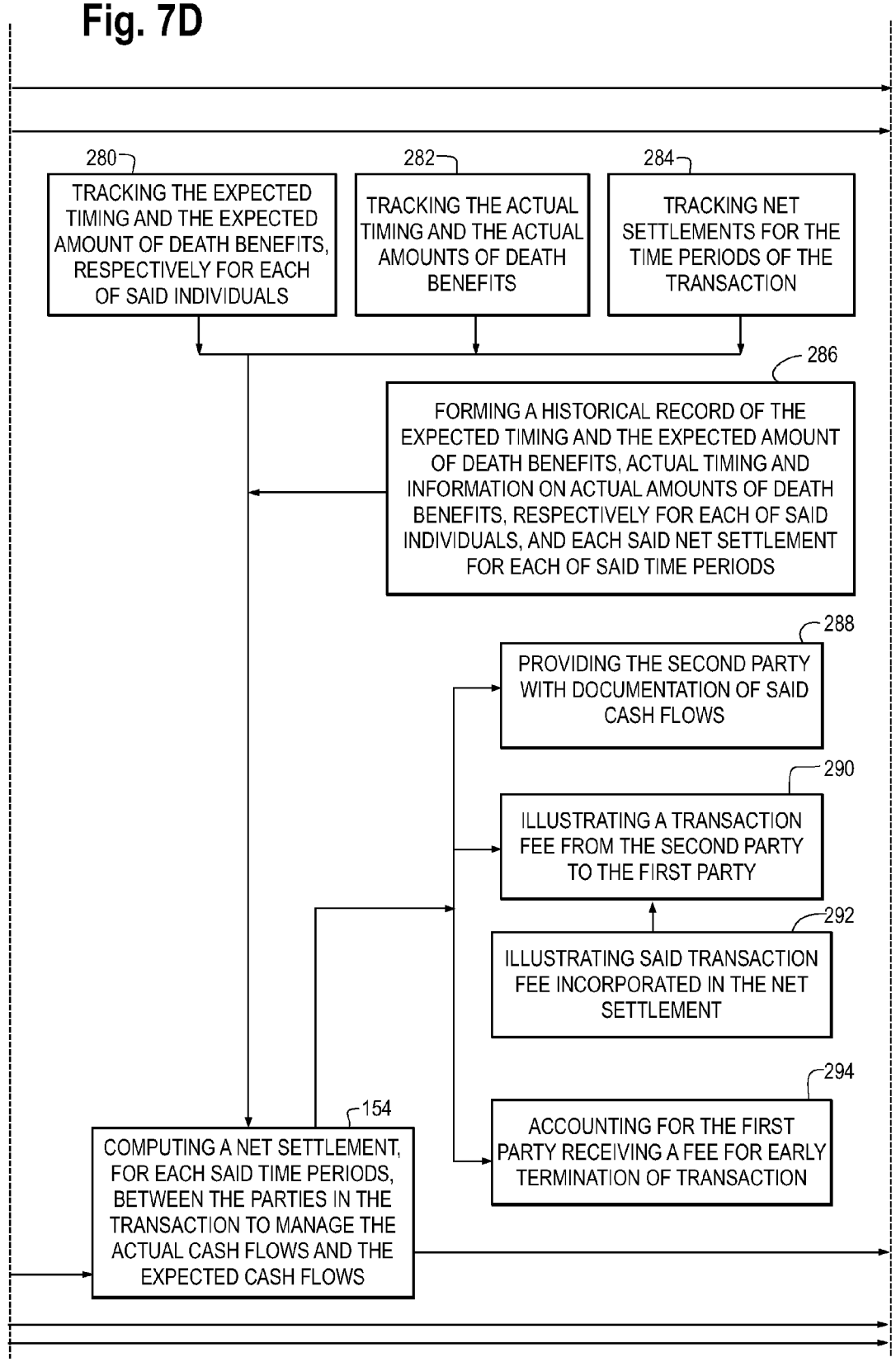

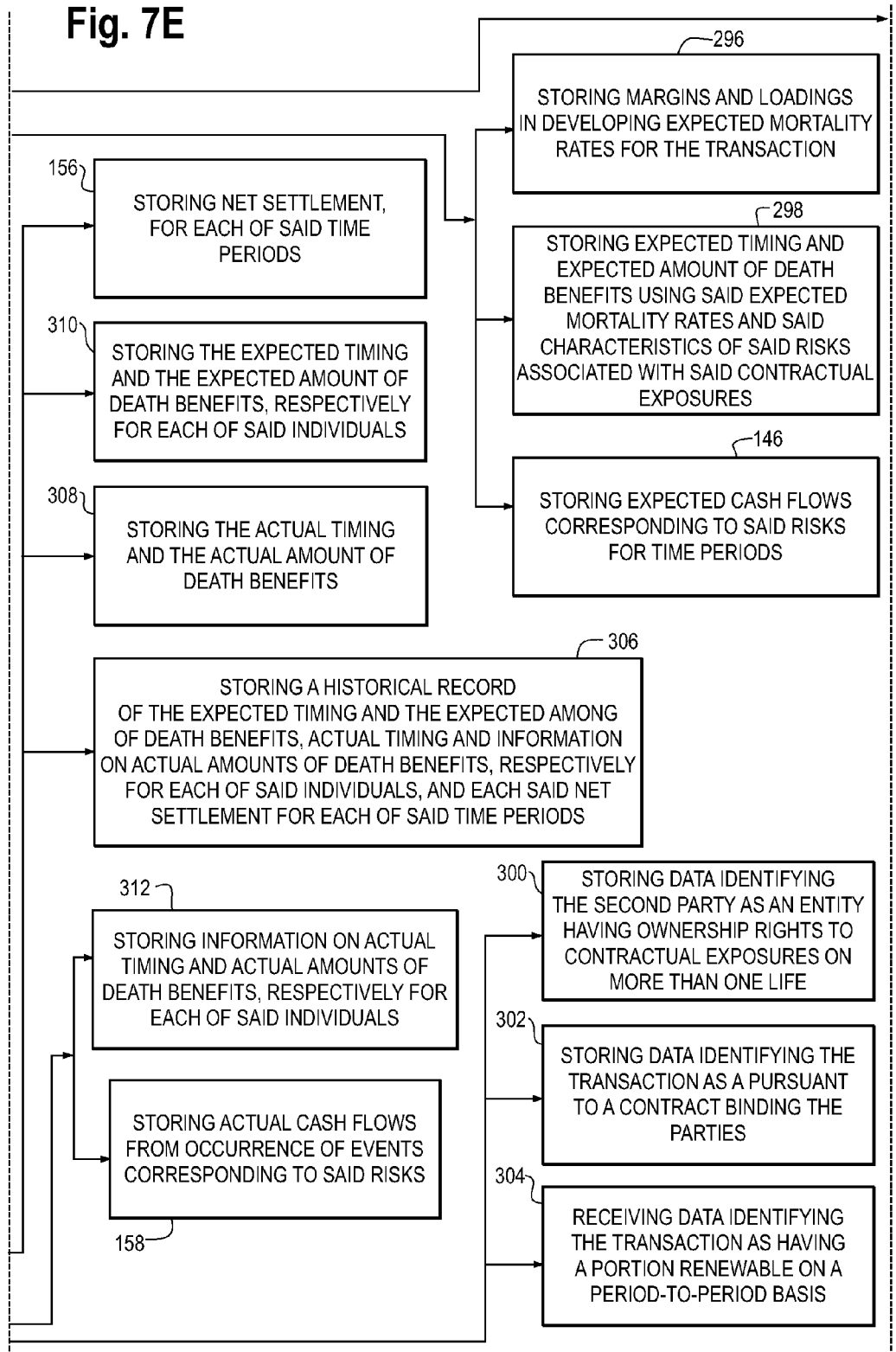

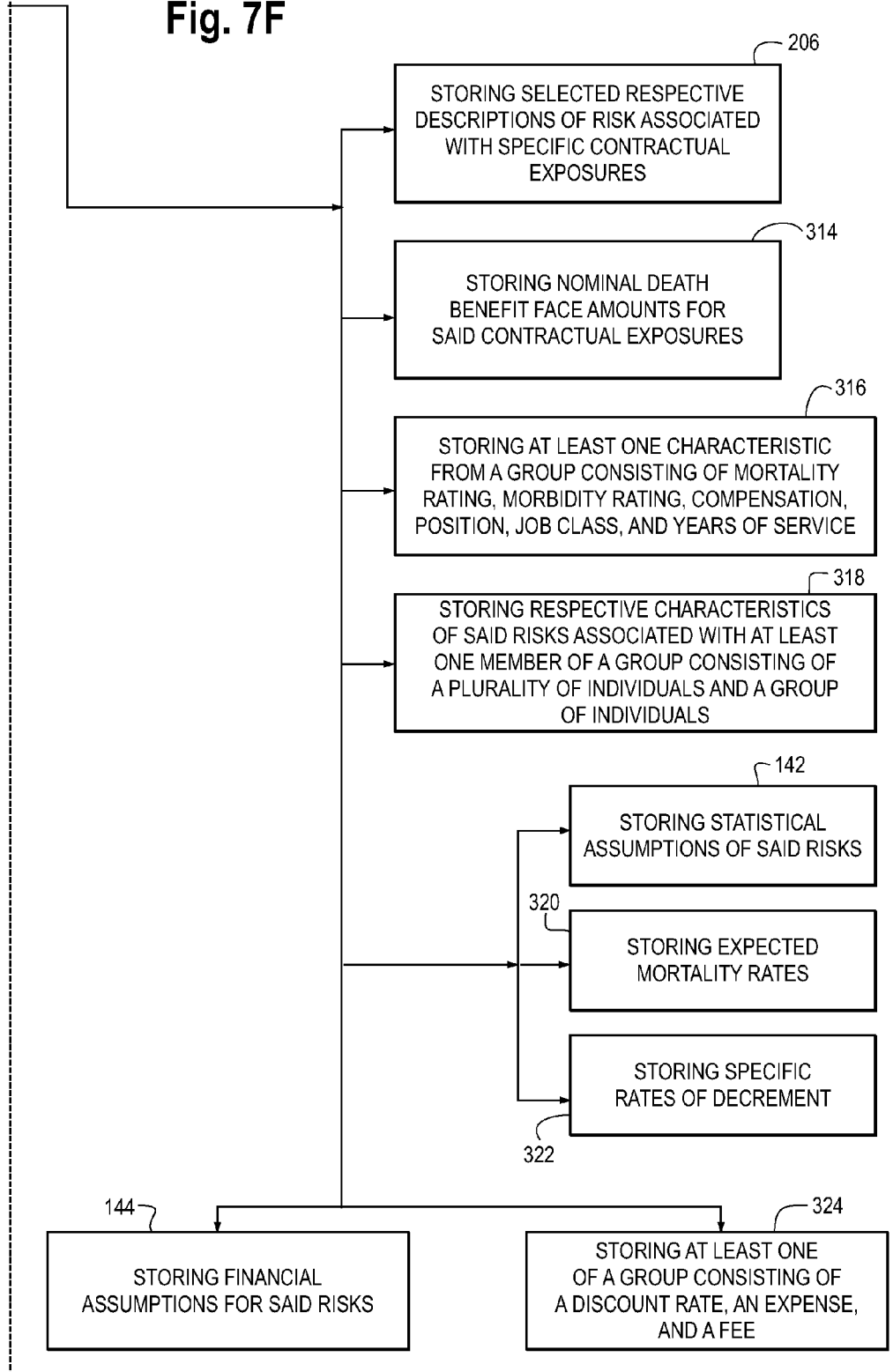

COMPUTER SYSTEM FOR CONTROLLING A SYSTEM OF MANAGING FLUCTUATING CASH FLOWS

I. TECHNICAL FIELD

The technical field is computers and data processing systems. Depending on the implementation, there is apparatus, a method for use and method for making, and corresponding products produced thereby, as well as data structures, computer-readable media tangibly embodying program instructions, manufactures, and necessary intermediates of the foregoing, each pertaining to digital aspects of managing fluctuating cash flows.

II. BACKGROUND ART

Corporations routinely purchase corporate-owned life insurance (COLI)/bank-owned life insurance (BOLI) contracts, the Policies, on employees, Covered Persons, in whom the corporation has an insurable interest. In many cases, these policies are purchased as funding vehicles to offset specific future corporate liabilities (e.g., deferred compensation plans). Because the policies pay death benefits upon the deaths of corporate employees, the corporations may have concerns regarding the potential deviation of the receipt of death benefits from the expected timing of such receipts, resulting in a mismatch of the cash flow derived from the COLI/BOLI contracts and the funding needs of the associated future liabilities.

In the life insurance industry, reinsurance is an important risk management tool. It is a contractual risk transfer that usually involves mortality risk transfer. It is a tool for ceding insurance companies to smooth out fluctuations in earnings which are usually heavily dependent on actual mortality results. The ceding insurance company has future actual mortality liability and wants certainty. The ceding company pays expected mortality plus costs in exchange for receipt of actual mortality.

In the financial sector, it is not uncommon that property & casualty (P&C) insurance derivatives are traded that swaps actual results for expected results using generic benefit index applicable to segments of the market What about entities, that own future actual mortality cash flows and want to eliminate the uncertainty in the timing and in the amount of these cash flows, for example, employers using BOLI/COLI as funding vehicles for future liabilities, securitization programs for life insurance funding such as charity, and any other organization that requires more predictable cash flows. There are corporations that are logical counterparties to these entities, such as, life reinsurers and large well funded Defined Benefit Pension Plans, where the life insurance risks taken on the swap would be general hedges against their current life reinsurance portfolio and their longevity risks, respectively.

Mortality and other benefit occurrences (such as disability or longevity) vary so much from one case to another that the generic benefit index pricing used in the P&C insurance derivatives is not sufficient to price the associated risks effectively.

In carrying out the foregoing, there have been significant needs regarding such as efficiency and/or security, with manual systems being prone to manual problems, and with automated variants having limitations regarding control and management of corresponding computer resources.

III. DISCLOSURE

In the area of said technical field, representatively: an apparatus for controlling a system of managing cash flows for a transaction, the apparatus comprising: data processing means arranged for receiving information into memory, said information comprising respective descriptions of risks, statistical assumptions for said risks, and financial assumptions for said risks, the data processing means further comprising: calculating means, responsive to said descriptions and said assumptions, for calculating expected cash flows corresponding to said risks for time periods; accounting means for determining, responsive to actual cash flow information from occurrence of events corresponding to said risks, for a first party to the transaction owing the expected cash flows to a second party to the transaction, and for determining, for the second party owing the actual cash flows to the first party, a net settlement, for each of said time periods, between the parties in the transaction, to manage the actual cash flows and the expected cash flows.

IV. BRIEF DESCRIPTION OF THE DRAWINGS

Figure 5C:
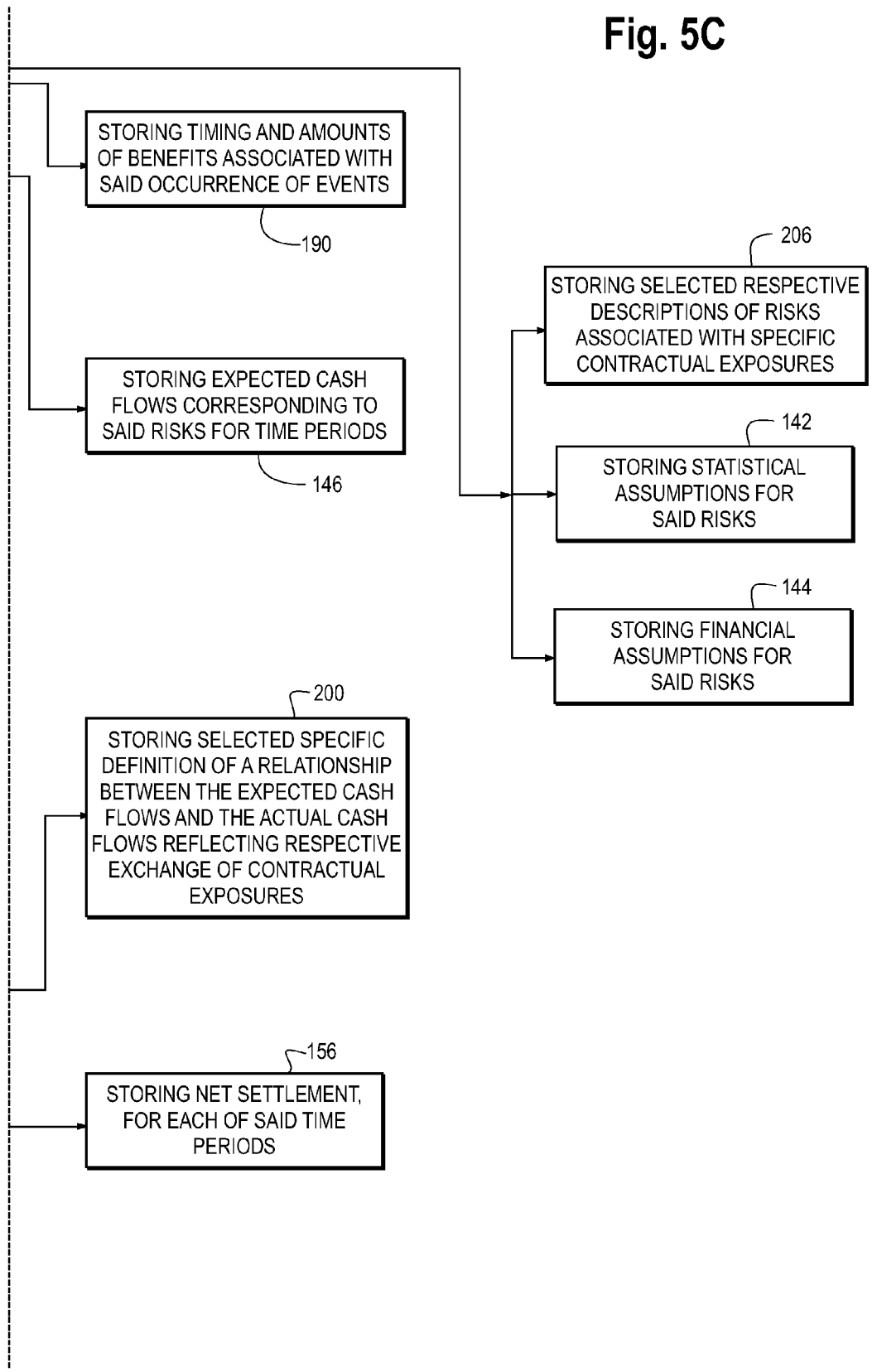
FIG. 5 shows a combination of FIGS. 5a-5C.

FIG. 5a, which continues through FIG. 5c, represents a portion of a flowchart showing the data input, computational and other logic, and the data output of the logic means for controlling the computer system in accordance with an embodiment as applied to an exchange of contractual exposures from insurable risks.

FIG. 5b is a continuation of FIG. 5a, and represents a portion of a flowchart showing the data input, computational and other logic, and the data output of the logic means for controlling the computer system in accordance with an embodiment as applied to an exchange of contractual exposures from insurable risks.

FIG. 5c is a continuation of FIG. 5b, and represents a portion of a flowchart showing the data input, computational and other logic, and the data output of the logic means for controlling the computer system in accordance with an embodiment as applied to an exchange of contractual exposures from insurable risks.

FIG. 6 shows a combination of FIGS. 6a-6c.

FIG. 6a, which continues through FIG. 6c, represents a portion of a flowchart showing the data input, computational and other logic, and the data output of the logic means for controlling the computer system in accordance with an embodiment as applied to securitizing funding for the contractual exposures.

FIG. 6b is a continuation of FIG. 6a, and represents a portion of a flowchart showing the data input, computational and other logic, and the data output of the logic means for controlling the computer system in accordance with an embodiment as applied to securitizing funding for the contractual exposures.

FIG. 6c is a continuation of FIG. 6b, and represents a portion of a flowchart showing the data input, computational and other logic, and the data output of the logic means for controlling the computer system in accordance with an embodiment as applied to securitizing funding for the contractual exposures.

FIG. 7 shows a combination of FIGS. 7a-7f.

FIG. 7a, which continues through FIG. 7f, represents a portion of a flowchart showing the data input, computational and other logic, and the data output of the logic means for controlling the computer system in accordance with an embodiment as applied to contractual exposures.

FIG. 7b is a continuation of FIG. 7a and represents a portion of a flowchart showing the data input, computational and other logic, and the data output of the logic means for controlling the computer system in accordance with an embodiment as applied to contractual exposures.

FIG. 7c is a continuation of FIG. 7b and represents a portion of a flowchart showing the data input, computational and other logic, and the data output of the logic means for controlling the computer system in accordance with an embodiment as applied to contractual exposures.

FIG. 7d is a continuation of FIG. 7c and represents a portion of a flowchart showing the data input, computational and other logic, and the data output of the logic means for controlling the computer system in accordance with an embodiment as applied to contractual exposures.

FIG. 7e is a continuation of FIG. 7d and represents a portion of a flowchart showing the data input, computational and other logic, and the data output of the logic means for controlling the computer system in accordance with an embodiment as applied to contractual exposures.

FIG. 7f is a continuation of FIG. 7e and represents a portion of a flowchart showing the data input, computational and other logic, and the data output of the logic means for controlling the computer system in accordance with an embodiment as applied to contractual exposures.

Figure 8:
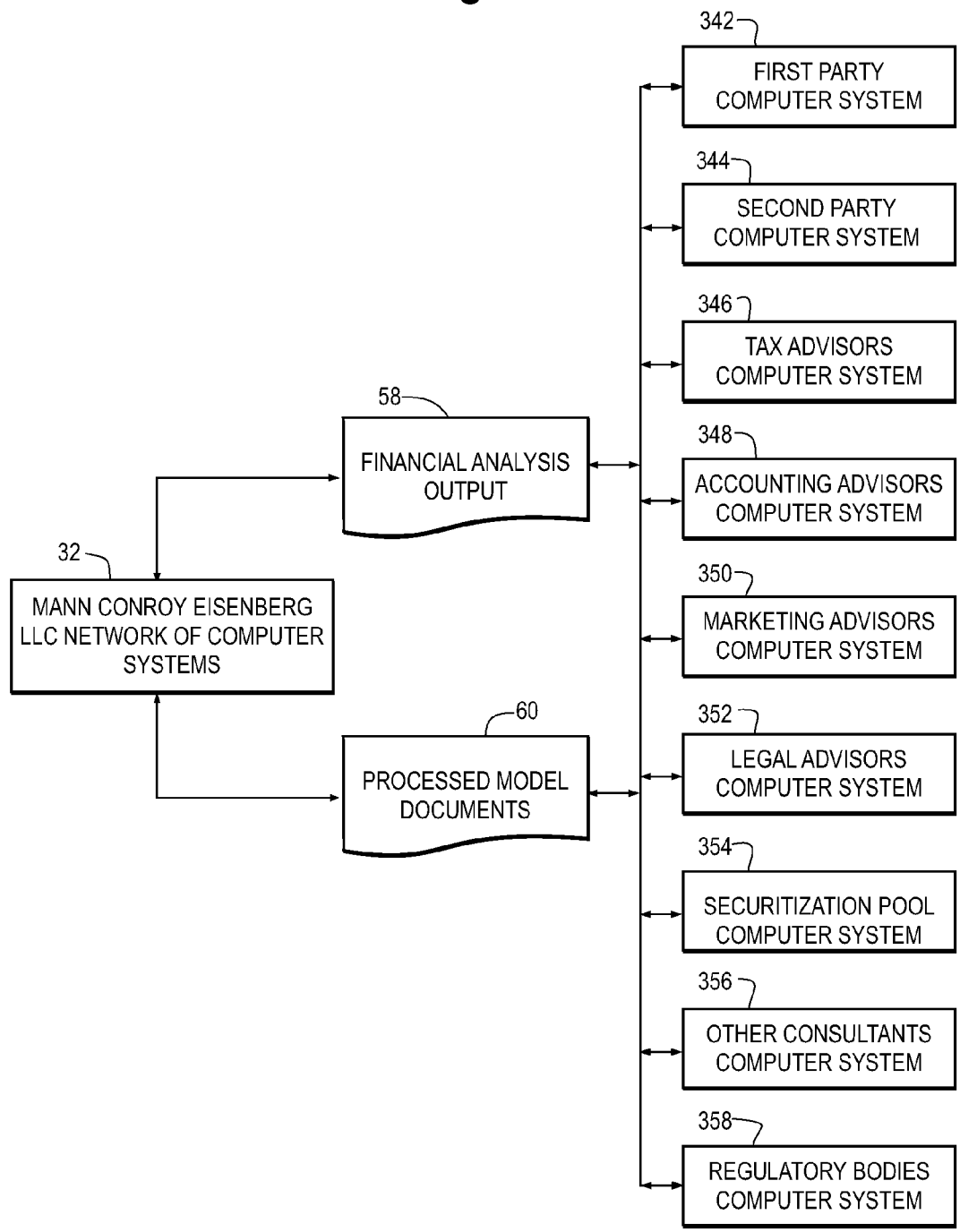

FIG. 8 is a graphic representation of interrelated computer systems in accordance with an embodiment.

Figure 9:
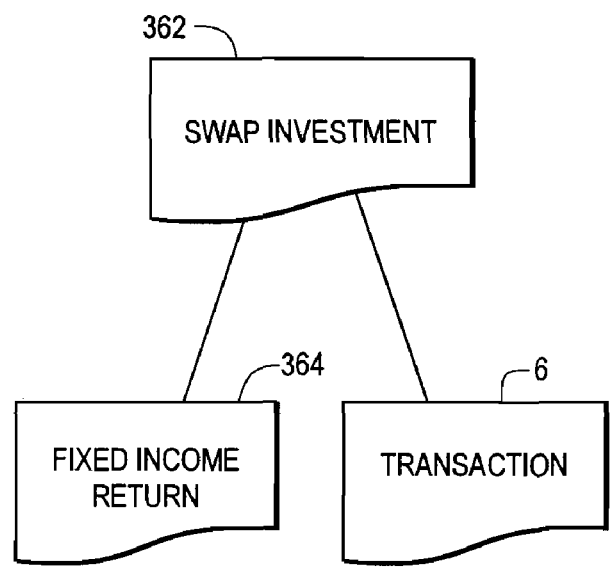

FIG. 9 is an illustration summarizing an embodiment as a swap security.

Figure 10:
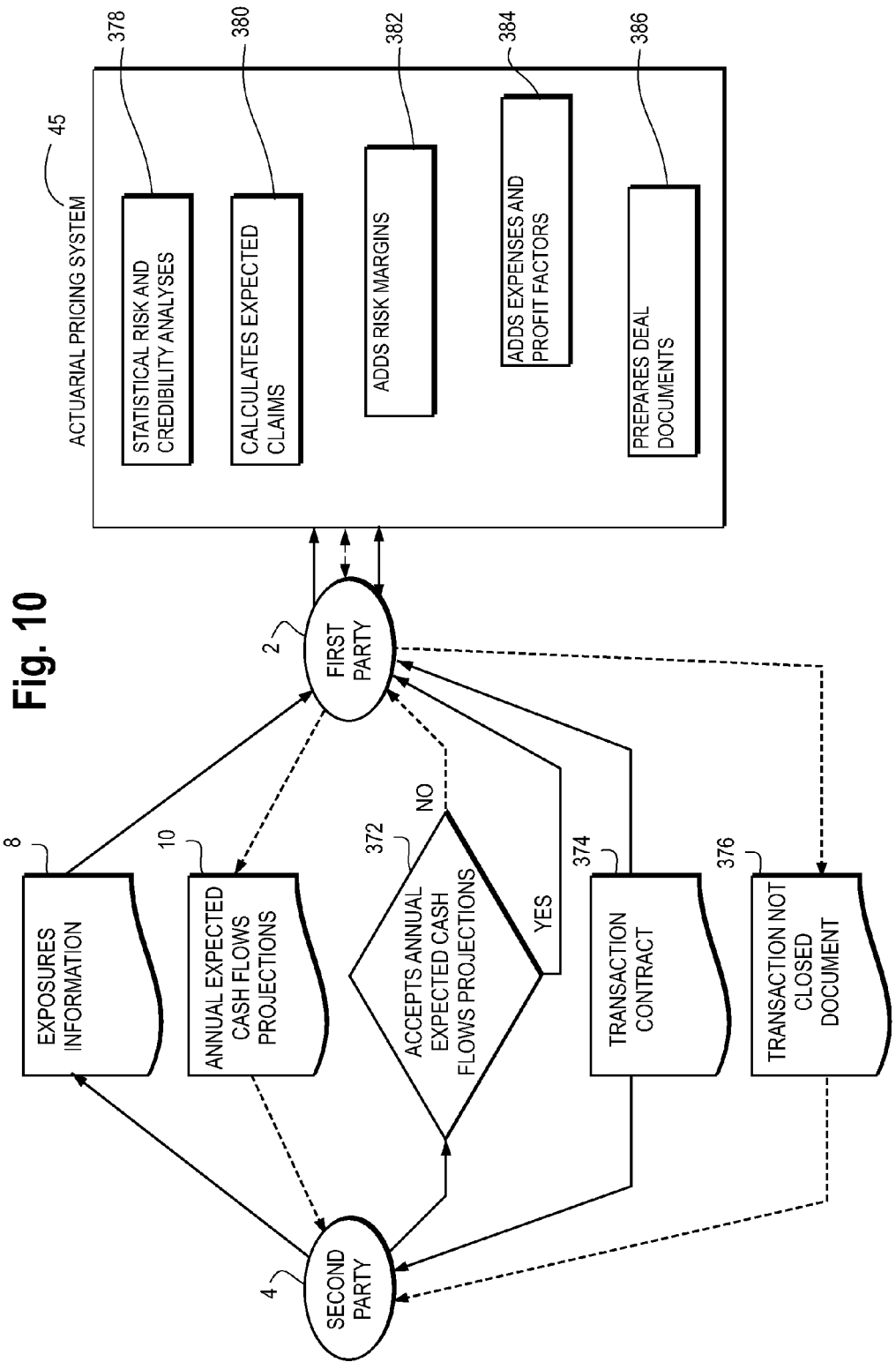

FIG. 10 is a graphic representation of the initiation of the transaction for a representative embodiment.

Figure 11:
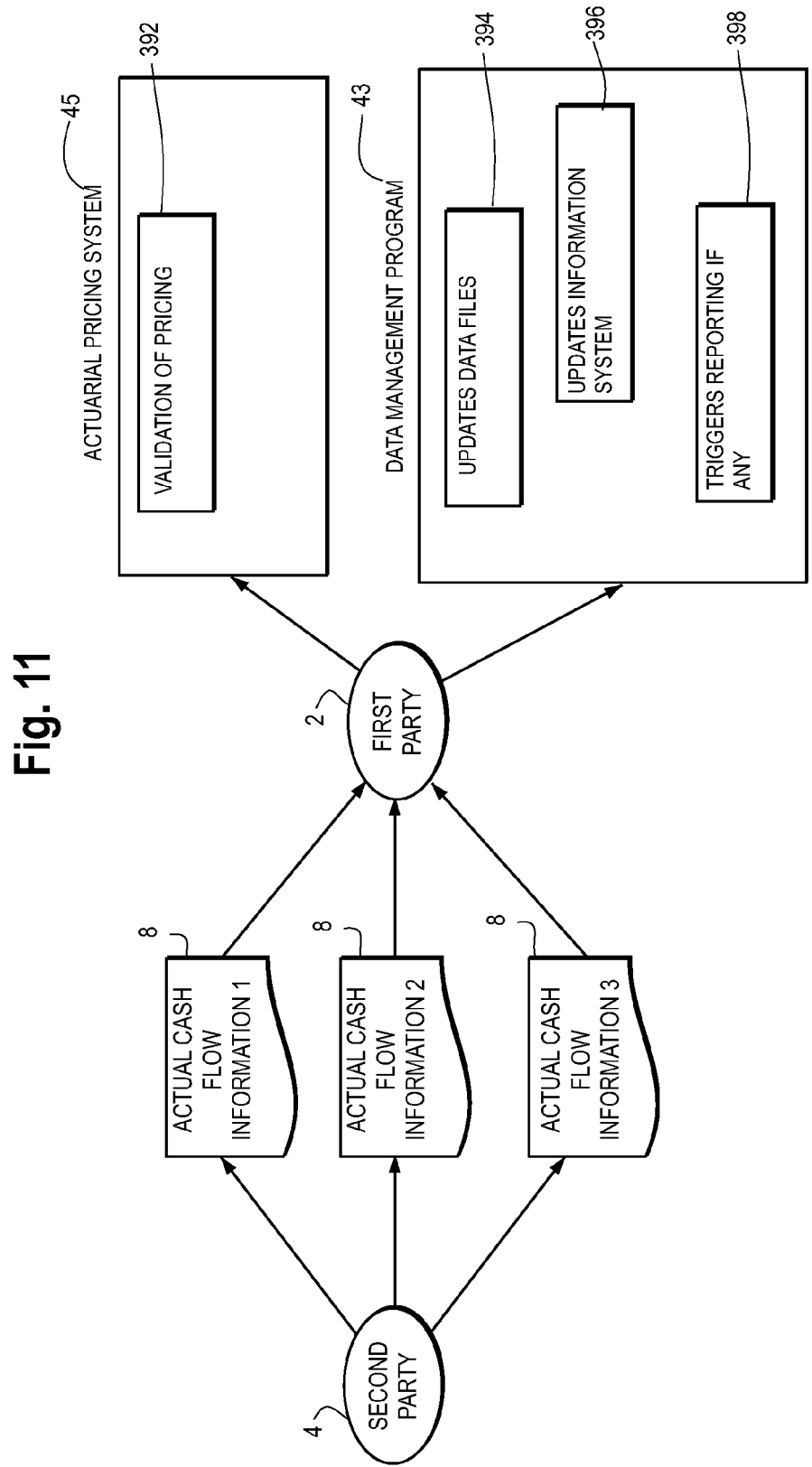

FIG. 11 is a graphic representation of the occurrence of events for a representative embodiment.

Figure 12:
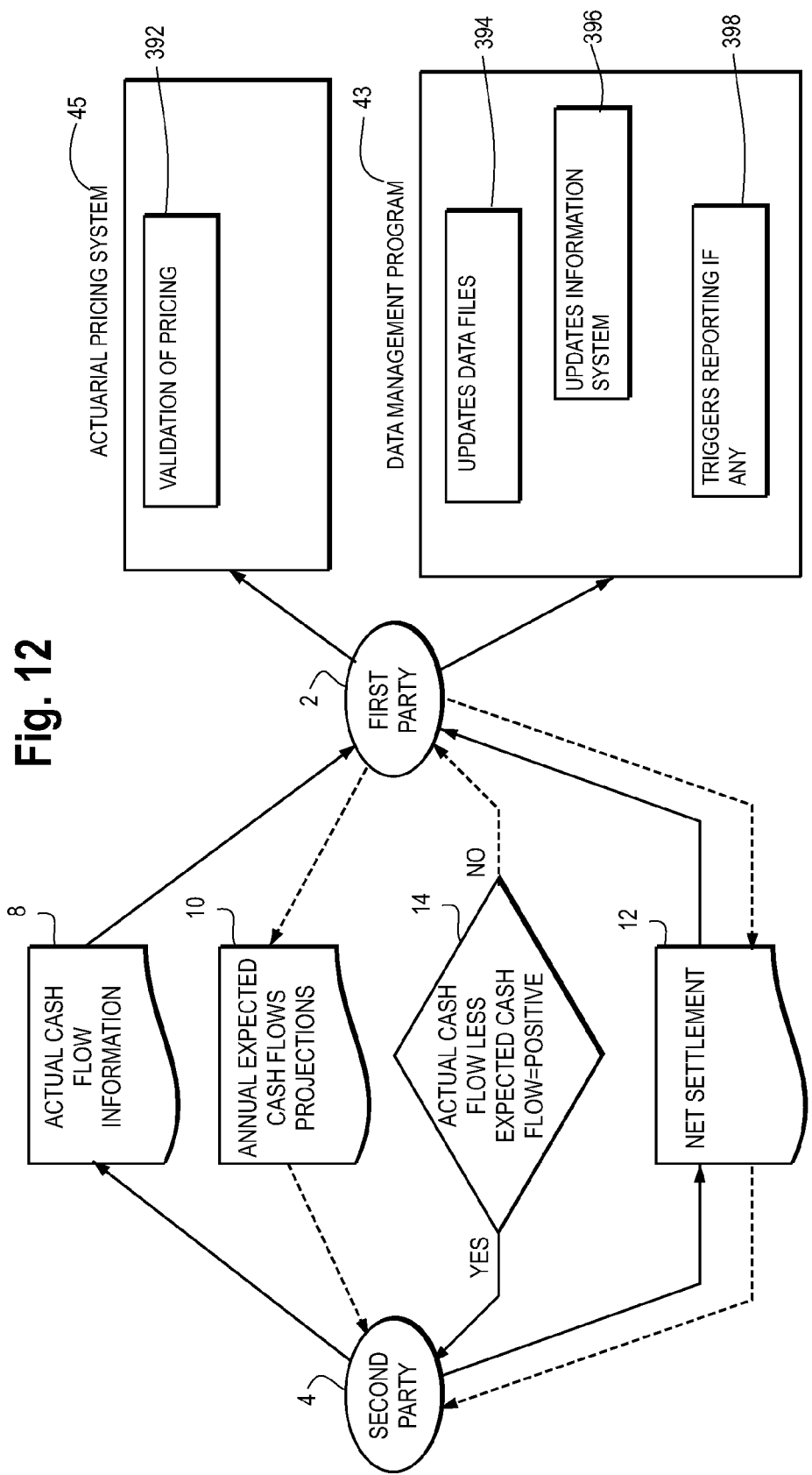

FIG. 12 is a graphic representation of the regular processes for a representative embodiment.

V. MODES

The accompanying drawings illustrate embodiments intended to illustrate and exemplify in a teaching manner.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow can be implemented in discrete circuits. Computer-readable media, as used herein can comprise at least one of a RAM, a ROM, A disk, an ASIC, and a PROM. Industrial applicability is clear from the description, and is also stated below.

By way of the following prophetic teaching, there is provided computer support, as in a data processing system, for implementing parts of, or from, a financial product or instrument to accomplish certain financial objectives to and advance such as efficiency and/or security, over said manual systems and corresponding problems, and automated variants having limitations regarding management of corresponding computer resources.

First, though, consider some context. In general, events, measurable by statistical or actuarial projections or probabilities, that fluctuate in timing and/or amount, where such events are uncontrolled by the parties, can produce irregular financial results. A SWAP, or the like, serves to add certainty to financial results for one party by shifting variable or irregular financial results to another party.

For example, this approach can be used to manage insurance policy death proceeds arising from a group of insureds and smooth out or regularize cash flows from the proceeds. The embodiment can be used in other applications, but this example is particularly instructive for understanding the nature of the embodiments and computer support therefore.

To carry out this approach, a financial derivative can be structured as a "Swap", similar to a Credit derivative. It can also be embedded into other financial instruments, for example, Bonds and Stocks. The policy beneficiary/owner (or another party with a beneficial interest in the policies, such as a charity) could enter a "Swap" contract with counterparty and would "Swap" actual mortality or other cash flows for the related expected cash flows. The policy beneficiary/owner would receive "Expected Mortality" or other "expected cash flow(s)" in exchange for "Actual Mortality" or other "actual cash flow(s)." The "Swap" terms would have to be specific to the underlying plan, program, and policies as mortality and other benefit occurrences vary so much from case to case. The analysis for development of these terms is included. A generic benefit index may not be readily developable to build a "generic" product similar to the traded P&C insurance derivatives. Too much "basis risk" could exist, making the product unattractive.

The counterparty's fees would be either explicit in the purchase price or incorporated in the "Expected Cash Flow" rates. The fee could be a one-time fee, or, more likely, a periodic fee. The swap could normally require mandatory renewal, e.g., except in the case where the underlying program has been terminated, in which case there would most likely be some sort of settlement The term of the product could be, say, 30 years, with a memo account tracking experience, with a settlement, should the plan of insurance be cut short. Expected Mortality rates paid could be based on the underlying policies, similar to rate setting for yearly renewable term (YRT) reinsurance treaties, so expected and actual cash flow(s) could be based on the makeup of the plan.

The counterparty could be either a disinterested third party or the original insurer issuing the product to the plan, or the reinsurer providing reinsurance cover to the original insurer, or all of the above. Whether or not the "Swap" qualifies as a "Hedge" under the IRC can be controlled, if desired. Also, a portion of the mortality risk, say the first $25,000 per life, could be left with the Policy Beneficiary/Owner (similar to "Excess Retention" reinsurance), if desired.

The transaction can be carried out with computer support, even including communications and documentation. For example, an insurance company receives premiums and pays benefits under policies sold to policy holders. A policy holder enters into a swap agreement with counterparty. Periodically, the counterparty and the policy holder calculate the actual benefits minus expected benefits to form a result. If the result is positive, policy holder pays counterparty, more or less, the result. If the result is negative, counterparty pays policy holder, more or less, the absolute value of the result.

In a representative embodiment, this kind of transaction differs from normal reinsurance between parties as the parties are not restricted to being insurance companies and reinsurance companies, but can be any entity that wishes to assume or transfer out mortality and morbidity risks.

Figure 1:
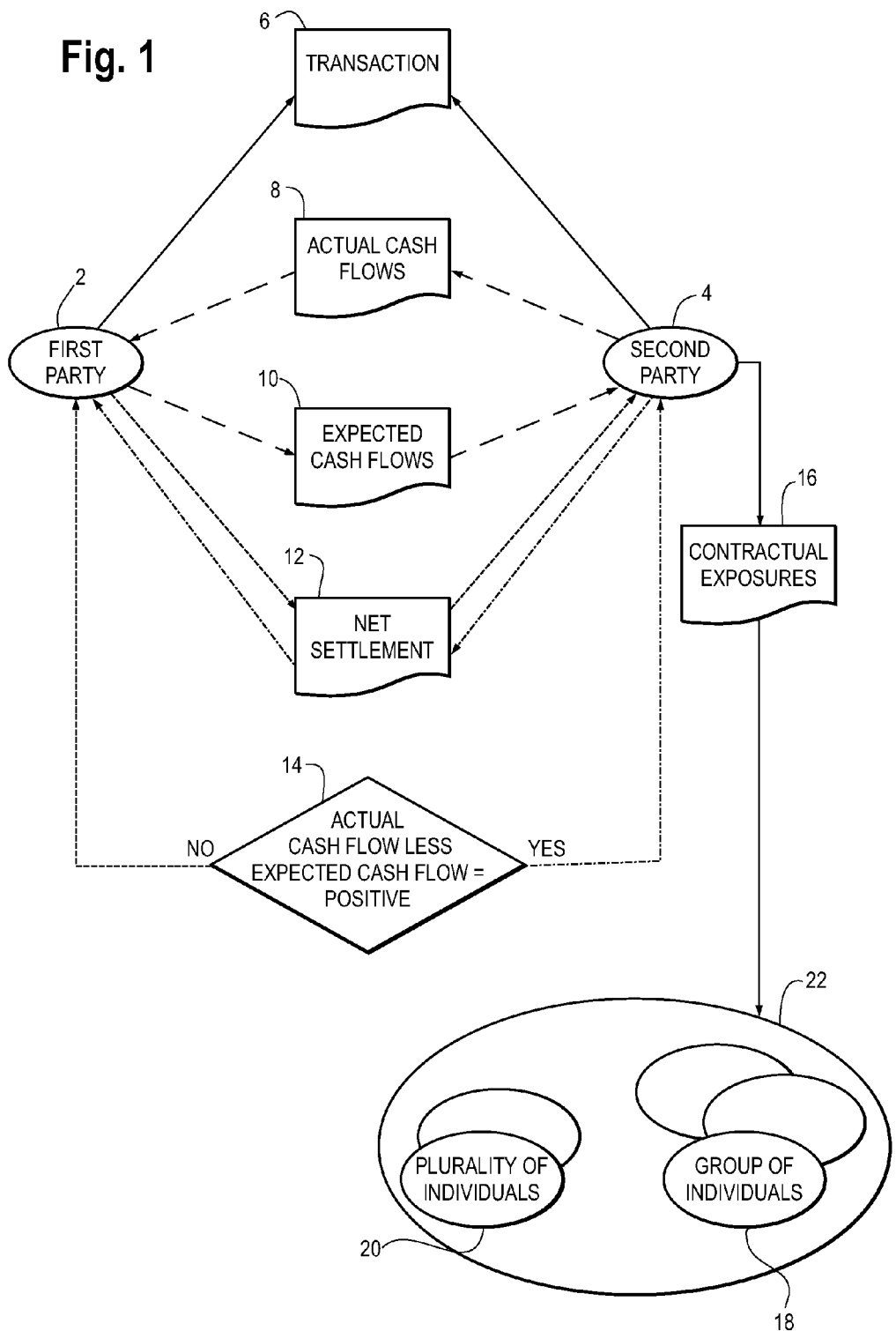
FIG. 1 is a graphic representation of a transaction for managing fluctuating cash flows.

FIG. 1 illustrates the nature of the financial innovation that gives rise to the need for the computer system and methods discussed herein. Corporations have contractual exposures, for example with respect to benefit payments, to individuals or to groups of individuals. Insurance or reinsurance contracts obtained by these corporations provide actual cash flows upon the occurrence of certain contingent events specified in the contracts. A contingent event could be death, disability, or survivorship. The financial innovation of provides a setting for the embodiments discussed herein so as to allow for (1) the exchange of these actual cash flows for expected cash flows, with respect to amount and timing, associated with these contractual exposures, (2) the regular settlement of the net of the actual and the expected cash flows from and to the corporation, and/or (3) the participation for consideration of a counterparty to the corporation.

A Second Party 4, usually a corporation, is subject to Contractual Exposures 16 of benefit payments to Plurality of Individuals 20. (Similarly, Second Party 4 could be subject to corporate Contractual Exposures 16 of benefit payments to a Group of Individuals 18. The Contractual Exposures 16 could be for risks associated with a member of a group, Block 22, consisting of Plurality of Individuals 20 and Group of Individuals 18). Second Party 4 usually contracts with an insurance or reinsurance company for these contractual exposures and receives actual cash flows upon occurrence of contingent events with respect to Plurality of Individuals 20 or Group of Individuals 18. There is no certainty to the timing and amount of actual cash flows. The financial innovation describes the Computer System 32 (see FIG. 2) and the methods for a Transaction 6 (in the nature of an exchange or a swap of expected results for actual results) between a First Party 2 (another party or a counter party, usually a reinsurer, another corporation, trust or individual) and the Second Party 4. This Transaction 6 enables Second Party 4 to manage, with respect to timing and amount, fluctuations of actual cash flows resulting from said Contractual Exposures 6. Second Party 4 would be accountable for Actual Cash Flows 8 to First Party 2 while First Party 2 would be accountable for Expected Cash Flows 10 to Second Party 4. A Net Settlement 12 of cash flows between First Party 2 and Second Party 4 occurs on a regular basis.

Figure 2:
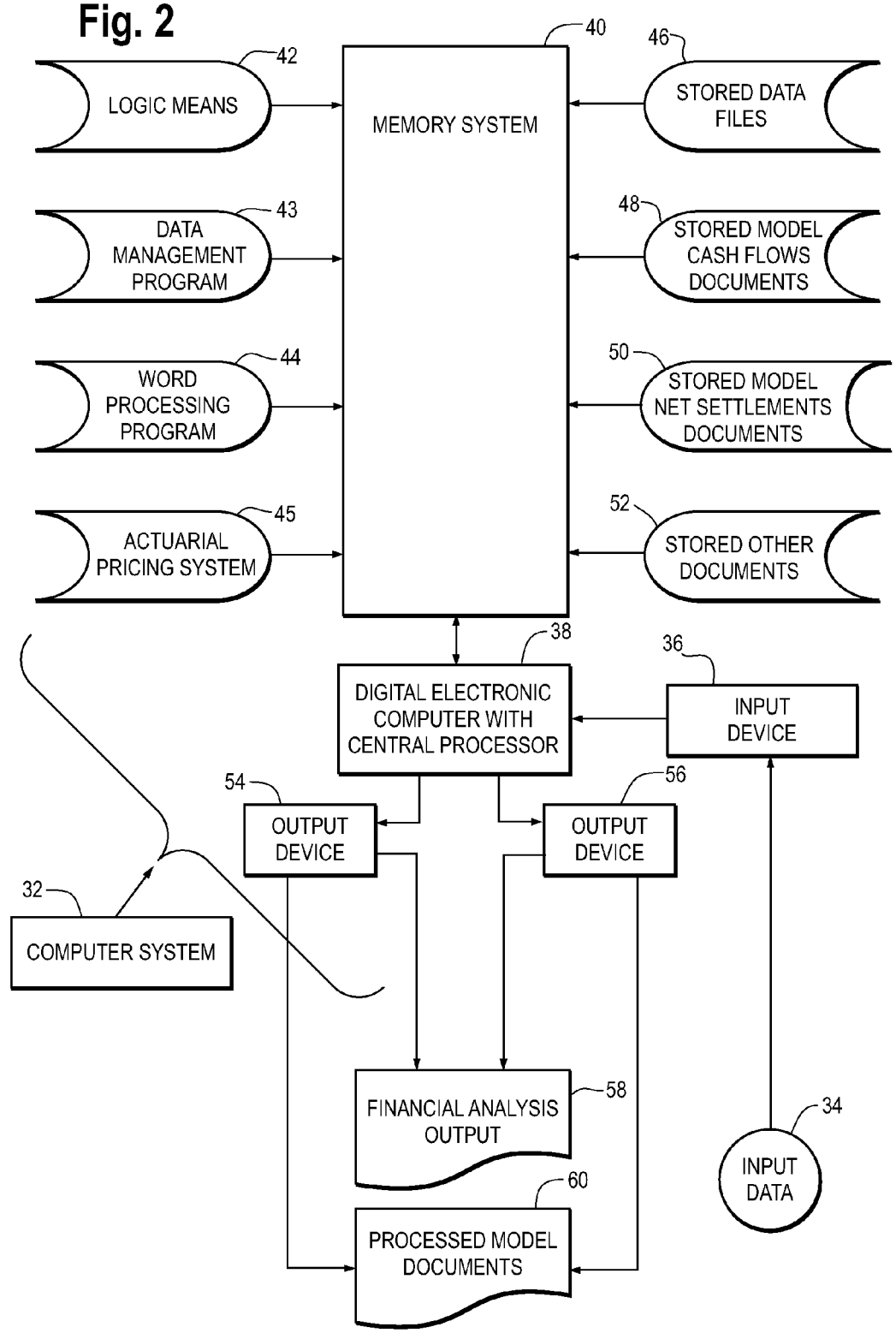
FIG. 2 is a diagram representing the computer system in accordance with an embodiment.

FIG. 2 provides a graphic presentation of the computer system for managing fluctuating cash flows. The modes of embodiment herein can be directed to a Computer System 32 (i) that manipulates digital electrical signals consisting of (a) Input Data 34 pertaining to the Contractual Exposures 16, (b) model documents including Stored Model Cash Flows Documents 48, Stored Model Net Settlements Documents 50 and Stored Other Documents 52, and (c) previously encoded and processed data Stored Data Files 46; (ii) that transforms these signals into analyses of the data and assumptions; (iii) that uses these transaction specific data and assumptions and price each transaction separately; (iv) that documents the results in Financial Analysis Output 58, and (v) that illustrates selected results in Processed Model Documents 60.

The Computer System 32 includes a Digital Electronic Computer with Central Processor 38, a Memory System 40, an Input Device 36, and preferably two output devices, Output Device 54 and Output Device 56. The Memory System 40 includes an operating system Logic Means 42 to run the Computer System 32 and applications software. For example, the operating system could be Microsoft XP Professional that would allow use of (a) its applications software such as Microsoft EXCEL, ACCESS, and WORD, and (b) actuarial pricing systems compatible with Microsoft XP Professional such as AXIS, TAS, or PROPHET. The Memory System 40 includes (a) a Word Processing Program 44 such as Microsoft Word to generate Processed Model Documents 60 using data, assumptions, and results, (b) a Data Management Program 43 such as Microsoft EXCEL or ACCESS to manage and evaluate data files, and (c) an Actuarial Pricing System 45 such as AXIS, TAS or PROPHET that access data files and assumptions and generates pricing results. The Input Device 36 such as a keyboard receives Input Data 34 either manually or electronically. Output Device 54 and Output Device 56, such as a printer or a CD drive; produce such relevant documents as the Financial Analysis Output 58. Financial Analysis Output 58, including the input data, processed results, statistical and financial assumptions, and other relevant information as well as processing logic, is normally shared via a network of computers as indicated in FIG. 8 (Computer System 32, and computer systems, Blocks 342-358, of parties involved such as First Party, Second Party, Tax Advisors, Accounting Advisors, Marketing Advisors, Legal Advisors, Securitization Pool, Other Consultants and Regulatory Bodies) and technical discussions occur until desired results are processed and illustrated formally in Processed Model Documents 60.

Input data 34, usually in the form of files, includes:
List of the lives associated with the contractual exposures, identified by codes and including an identification of whether the contractual exposures are on individual lives or a group of lives;
Characteristics of the risks associated with these lives, at least one of, sex, age, mortality rating, morbidity rating, compensation, position, job class and years of service;
Rates of decrement (in the form of statistical assumptions such as mortality rates) associated with these lives as per the Contractual Exposures 16;
Financial assumptions, at least one of, discount rate, expense and fee;
Updates to above;
Pricing assumptions, and any updates;
Actual cash flows, timing and amount, per life (or group of lives);
Transaction data including:
    Legal name of First Party 2;
    Legal name of Second Party 4;
    Effective date of the transaction;
    Duration of the transaction and renewability options;
    Transaction fee, which could be a single fee or an annual fee incorporated in the regular net settlement; and
    Other fees, at least an early termination fee.
Processed data includes:
Expected rates of decrement, and any updates;
Expected cash flows, timing and amount, per life (or group of lives), per regular time period;
Actual cash flows, timing and amount, per life (or group of lives), per regular time period;

Net settlement, per regular time period, illustrating separately transaction fee and other fees; and Comparative, year-to-date and historical versions of the above data.

Figure 3:
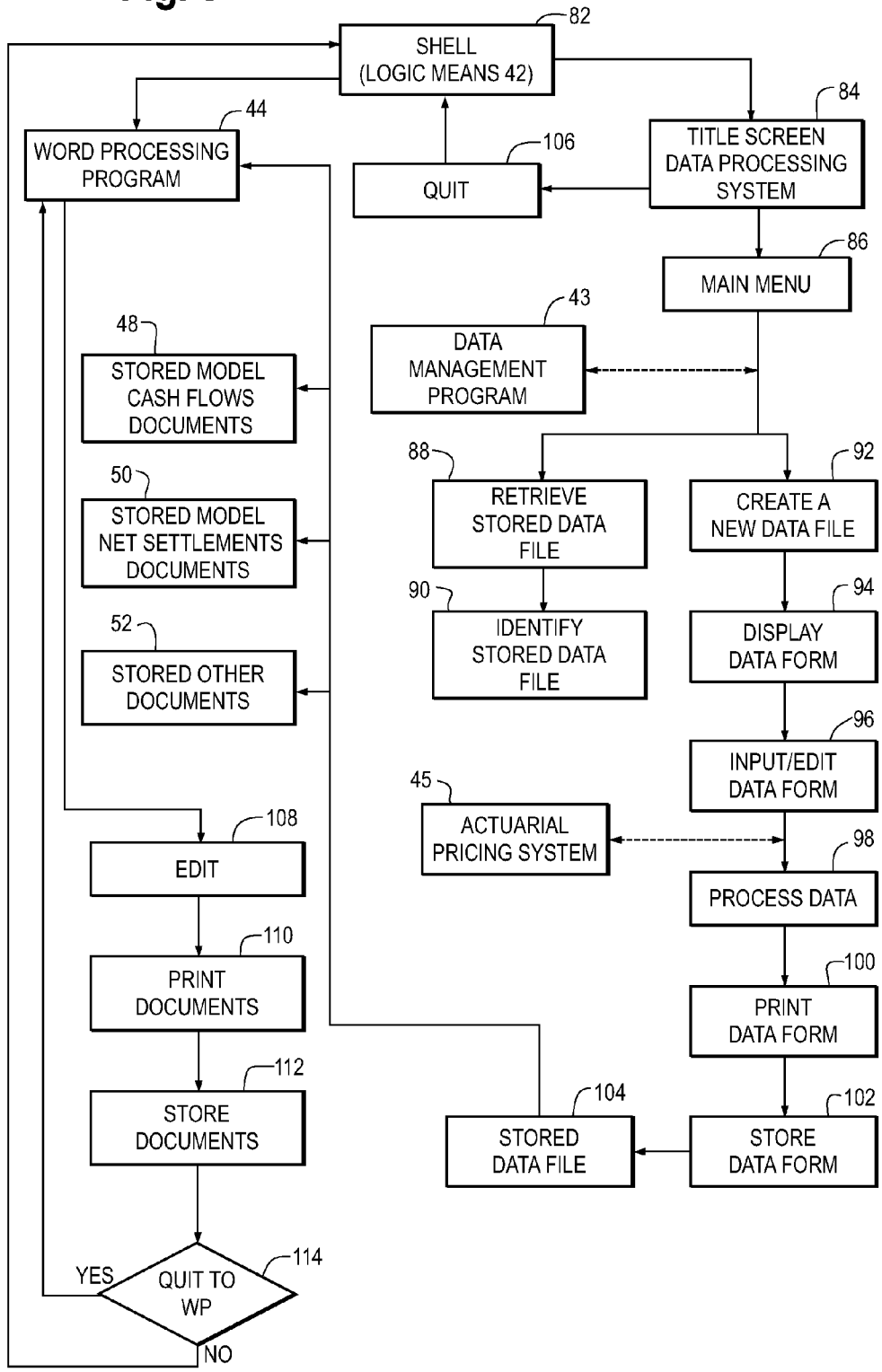
FIG. 3 is a flowchart showing the logic of the logic means for controlling the computer system in accordance with an embodiment.

FIG. 3 is a flowchart of the overall operational processes for Computer System 32 (see FIG. 2). Shell 82 allows for two pathways, one for processing data, using Title Screen Data Processing System 84, and the other for processing model documents, using Word Processing Program 44.

Title Screen Data Processing System 84 could be a coded or programmed EXCEL application, or similar application software that allows processing of numbers and logical evaluations. Starting with Main Menu 86, that allows for the processing of information for the embodiment at issue, and using Data Management Program 43, the system allows for creation of new data file (Block 92) and update of existing data file (Block 88, retrieval of data file and Block 90, identification of data file); then display (Block 94) and input/edit (Block 96) of data form. Using Actuarial Pricing System 45, the system allows for the processing (Block 98) of these data files. This pricing system generates multiple scenario results used for pricing evaluation and then the final results for the specific transaction. Using Data Management Program 43 (see FIG. 2) data information is printed (Block 100), data form (Block 102) is stored, and data file (Block 104) is stored. Using Word Processing Program 44, model cash flows documents, model net settlements documents and other documents are stored as per Blocks 48-52. Data files are maintained historically, per contract, from its effective date. Data storage is physically in the computer or in a computer readable file kept offsite. As defined in detail above, data includes statistical assumptions, financial assumptions, respective descriptions of risks, pricing data, expected cash flows corresponding to said risks for time periods for the duration of the contract, actual cash flows information from occurrence of events corresponding to said risks, net settlement for each said time periods between the parties in the transaction, transaction fee and fee for early termination of the contract.

Word Processing Program 44 allows for creating blank model documents (Blocks 48-52, cash flow documents, net settlements documents and other documents), editing existing model documents for any updates (Block 108), printing such results (Block 110) and storing different versions of model documents (Block 112). Model documents showing current results and usually comparative, year-to-date and historical results are also produced regularly. Model documents per regular accounting periods showing actual results, expected results and net settlements are maintained historically per contract.

The Logic Means 42 allows for continuing processing in Blocks 84, 86 and 114 (thru the title screen, main menu and the logic to continue with the word processing program) as well as for finalization of the process thru Blocks 108 and 114 (thru the quit routine in the title screen and the logic to quit with the word processing program).

Figure 4:
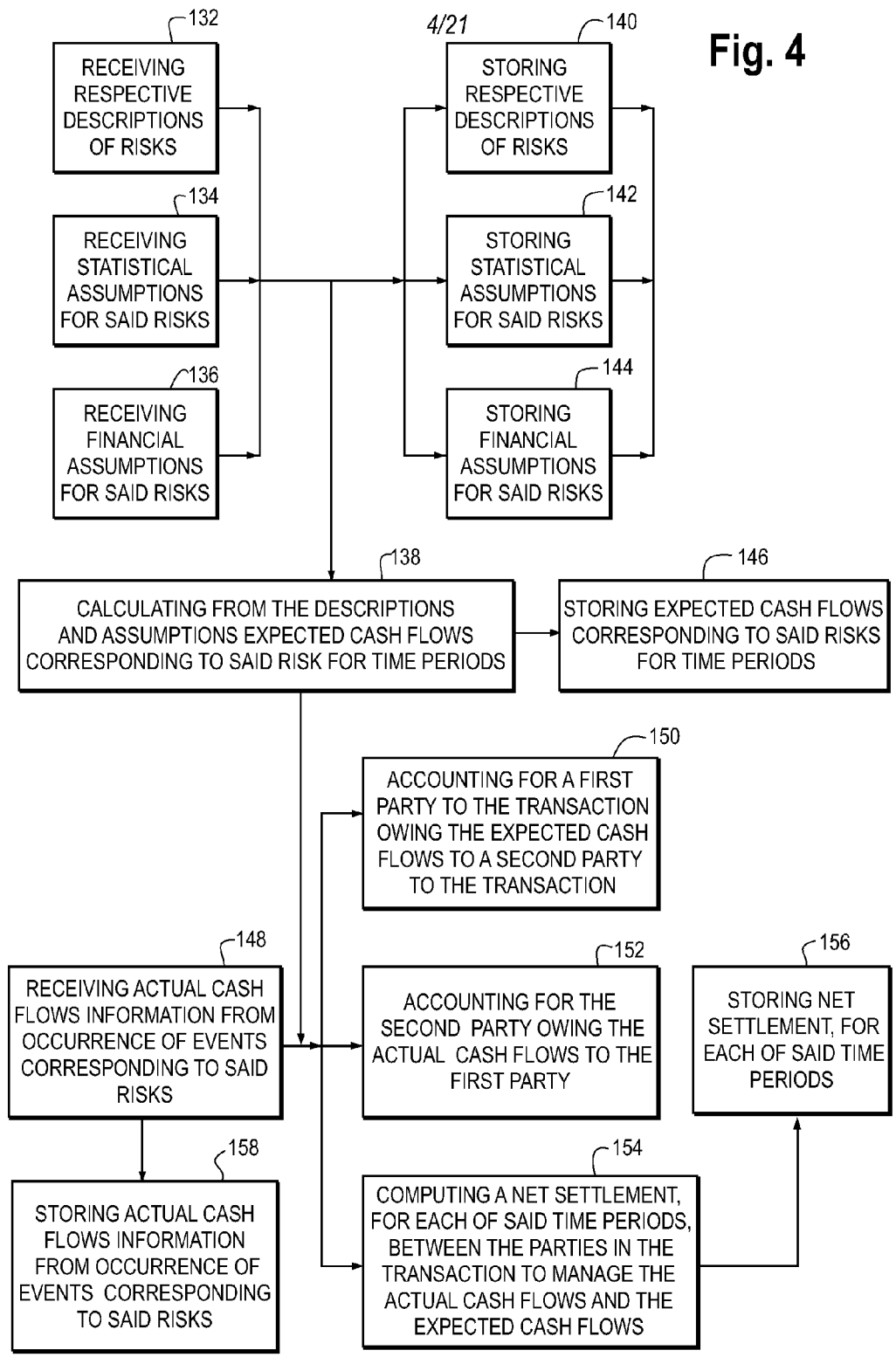
FIG. 4 is a flowchart showing the data input, computational and other logic, and the data output of the logic means for controlling the computer system in accordance with an embodiment.

FIG. 4 shows the logic of the processes in a representative general embodiment Input data is received starting from the early stages of preparation for the transaction and during regular time periods for the duration of the contract. The process includes Receiving Respective Descriptions of Risks 132, Receiving Statistical Assumptions for Said Risks 134, and Receiving Financial Assumptions for Said Risks 136 in order to perform Calculating Expected Cash Flows 138. The risks refer to the risk parameters, such as age, sex, mortality rating and others, associated with either Plurality of Individuals 20 or Group of Individuals 18 (see FIG. 1), as is appropriate for the Contractual Exposures 16 (see FIG. 1). The statistical assumptions, such as the expected mortality rates, characterize and correspond to the risks associated with the contractual exposures. The financial assumptions reflect the financial terms agreed upon by First Party 2 and Second Party 4 and allow for the calculation of the timing and amount of expected cash flows, and with the pricing data allow for the calculation of the resulting transaction fee and other fee such as fee for early termination. The assumptions are stored by the computer system. From time-to-time, these assumptions are reviewed and revised. Any further discussions are initiated by either First Party 2 or Second Party 4 for any assumption revisions that affect the terms of the transaction. The computer system maintains all relevant data for generating the financial results per regular time period, per year-to-date period, per comparative time periods and historically. Storage off-site is also maintained. Blocks 140-146 and 156-158 allow for the storage of information. These processes include Storing Descriptions of Risks 140, Statistical Assumptions 142, Financial Assumptions 144, Expected Cash Flows 146, Net Settlement 156 and Actual Cash Flows 158.

Receiving Actual Cash Flows Information from Occurrence of Events Corresponding to Said Risks 148 is performed during regular accounting periods and data is provided by Second Party 4. An example of the occurrence of an event is the death of one of Plurality of Individuals 20 and receipt by Second Party 4, from either an insurance company or a reinsurance company, of an actual death benefit increased with interest credited from date of death. Or it could be that the occurrence of the event is a trigger for the contractual payment liability of Second Party 4 (who is contractually liable but is self-insuring the death benefit payment).

The regular processing at said time periods include Accounting for First Party owing Expected Cash Flows to Second Party to the Transaction 150, Accounting for Second Party owing Actual Cash Flows to First Party 152 but only Computing a Net Settlement 154 which becomes the basis of the exchange of moneys between First Party 2 and Second Party 4. The exchange of moneys is accompanied by documents showing actual cash flows, expected cash flows, net settlement, transaction fee and fee for early termination (if appropriate) for the current time period and other agreed-upon comparative or cumulative data. The Processed Model Documents 60 also includes the appropriate transaction details.

FIGS. 5-5c shows the logic of the processes in the representative general embodiment as an exchange of contractual exposures from insurable risks. The present representative embodiment involves Computer System 32 for managing fluctuating cash flow(s). In general, uncertain events that can be measured using statistical or actuarial methodologies but are not certain in timing and/or amounts, and such events are uncontrolled by the parties, can produce financial results that may vary from expected results. A SWAP of expected results for actual results, or the like, for example, either on a "proportional", "non-proportional", "symmetric", or "asymmetric" basis (es), serves to add certainty to financial results for one party by shifting variable or irregular financial results to another party.

For example, this approach can be used to manage insurance policy death proceeds arising from an insured group by adding certainty to the otherwise variable cash flow(s) from the death proceeds. One embodiment or another can be used in other applications, but this idea is particularly instructive for understanding computer support therefore.

To carry out this approach, a financial derivative can be structured as a "Swap", similar to a Credit derivative. The policy beneficiary/owner or another party with a beneficial interest in the policies, such as a charity (beneficiary) could enter a "Swap" contract with counterparty and would "Swap" actual mortality or other cash flow(s) for the related expected mortality or other cash flow(s). The Beneficiary would receive "Expected Mortality" or other "expected cash flow(s)" in exchange for "Actual Mortality" or other "actual cash flow(s)." The "Swap" terms would be specific to the underlying plan, program, and/or policies as expected, as well as actual mortality and other benefit occurrences, vary so much from case to case. A generic benefit index may not be readily developable to build a "generic" product similar to those used in the traded P&C insurance derivatives. Too much "basis risk" could exist, making the product unattractive.

The counterparty's fees would be either explicit in the purchase price or incorporated in the "Expected Cash Flow" rates. The fee could be a one-time fee, or, more likely, a periodic fee. The swap could normally require mandatory renewal, e.g., except in the case where the underlying program has been terminated, in which case there would most likely be some sort of settlement, since one of the parties may have the ability to control whether or not termination takes place. The term of the product could be, say, 30 years, with a memo account tracking experience, with a settlement, should the plan of insurance be cut short. Expected Mortality rates paid would be based on the underlying policies, similar to rate setting for YRT reinsurance treaties, so expected and actual cash flow(s) could be based on the makeup of the plan.

The counterparty could be either a disinterested or interested third party. Whether or not the "Swap" qualifies as a "Hedge" under the Internal Revenue Code or GAAP Accounting Rules or both can be controlled, if desired. Also, a portion of the mortality risk, say the first $25,000 per life, could be left with the Policy Beneficiary/Owner (similar to "Excess Retention" reinsurance), if desired.

Computer support will generally be useful in at least evaluating and pricing the SWAP at the time the contract is agreed to, as well as in calculating the periodic net settlements.

Receiving respective characteristics of said risks, referring to Plurality of Individuals 20, (or Group of Individuals 18, as is appropriate), involves Selecting Respective Descriptions of Risks 184 (in general, characteristics associated with the actual nature of the Contractual Exposures 16) from among Respective Insurance Risk Coverage of Individuals 172, Respective Contractual Insurable Risk Exposure to Individuals 174, Contractual Exposures From COLI Coverage of Individuals 176, Contractual Exposures from BOLI Coverage of Individuals 178, Corporate Contractual Benefit Payment Exposures to Individuals 180 or Contractual Exposures in a Reinsurance Treaty 182, as is specific to the particular transaction. Additional data input steps include Receiving Statistical Assumptions 134, and Financial Assumptions 136. All these information allows the computer to Process Descriptions and Assumptions 186 and Calculate Timing and Amounts of Benefits 188 associated with the risks, Plurality of Individuals 20 (or Groups of Individuals 18, as is the case). And more specifically the system calculates corresponding Expected Cash Flows for Time Periods in Block 138 (see FIG. 4). Agreed upon time periods could be annually, quarterly, monthly, or as defined by the parties.

Upon occurrence of events, actual cash flow data can be provided to the system though Receiving Actual Cash Flows Information in Block 148. The computer system then continues the process with Accounting for a First Party owing the Expected Cash Flows 150 and Accounting for the Second Party owing the Actual Cash Flows 152.

Another process involves the definition of the relationship between the actual cash flows and the expected cash flows and involves discussions between Second Party 4 and First Party 2 and among all or some of the parties identified by their computer systems in FIG. 8, such as the inventors, the parties, the consultants and other bodies providing input The selection process is Selecting a Specific Definition of a Relationship between Expected Cash Flows and the Actual Cash Flows 198. The choices in the selection are A Relationship between the Expected Cash Flows and the Actual Cash Flows Reflecting a Symmetric Exchange of Non-proportional Contractual Exposures 192, Reflecting a Symmetric Exchange of Proportional Contractual Exposures 194 or Reflecting an Asymmetric Exchange of Proportional and Non-proportional Contractual Exposures 196. Assumptions of a large portfolio of lives and a known distribution of results, usually normal distribution, underlie the evaluation of proportional or non-proportional exposures and of symmetric or asymmetric exchanges which are relationships between actual and expected results. First Party 2 will evaluate the risks associated with the symmetric and proportional bases and negotiate with Second Party 4 the final relationship. As an example of a proportional and non-proportional asymmetric swap before incorporating margins and loadings, Second Party 4 could be accountable to the First Party 2 for 10% of all actual claims better than mean portfolio expected results in exchange for First Party 2 being accountable to Second Party 4 for all actual results in excess of 1.5 standard deviations of a normal distribution of portfolio expected results. Once the relationship has been defined, all Pricing Data Reflecting the Exchange 202 (including this relationship) is also coded into the computer system. The pricing process starts with evaluating the pure risk relationship between the cash flows. Then risk margins are incorporated. Profit margin and other pricing parameters (loadings) such as expenses are then incorporated. The price for the transaction can be a single fee, or a yearly fee incorporated into the expected results. The contract is expected to be renewable for durations of 30 plus years. As such a provision for early termination is reflected in an early termination fee agreed upon by both parties. The process continues to Computing a Net Settlement 154 reflecting such relationship and the corresponding pricing data. The net settlement is a payment by Second Party 4 of the excess of actual to expected cash flows and a payment by First Party 2 of the excess of expected to actual cash flows.

All input data and data resulting from the logic processes are stored in the computer with steps indicated in Blocks 142-146, 156-158, 190, 200, 204 and 206. These include storing Selected Descriptions of Risks 206, Statistical Assumptions 142, Financial Assumptions 144, Expected Cash Flows 146, Net Settlement 156, and Actual Cash Flows 158. Further included are storing the timing and amounts of Benefits 190, Selected Relationship between Expected and Actual Cash Flows 200, and Pricing Data 204.

FIGS. 6-6c shows the logic of the processes in the representative general embodiment as applied to securitizing funding for the contractual exposures.

First Party 2 could be a securitization pool. A securitzation pool usually pays out a lump sum value in exchange for a series of future cash flows. A securitization pool has access to future cash flows and can be accountable for the expected cash flows in the transaction for this representative general embodiment.

Among Blocks 172-180, all pertaining to risks associated with contractual exposures to individuals, Block 212 allows for selecting Respective Descriptions of Risks as is appropriate for the transaction. The risks as appropriate to the transaction could be those received and associated with (1) Contractual Exposures from Respective Insurable Risk Coverage of Individuals 172, (2) Respective Contractual Risk Exposure to Individuals 174, (3) Contractual Exposures from COLI Coverage of Individuals 176, (4) Contractual Exposures from BOLI Coverage of Individuals 178, and (5) Corporate Contractual Benefit Payment Exposures to Individuals 180. The steps Receiving Statistical Assumptions for Said Risks 134 and Receiving Financial Assumptions for Said Risks 136 complete input of data. Then these data are processed to generate expected cash flows thru Block 214, Processing Responsive to Data Reflecting Securitizing of Funding for the Contractual Exposures, and Block 138, Calculating From the Descriptions and Assumptions, Expected Cash Flows Corresponding to Said Risks for Time Periods Block 148 provides actual cash flows information. With the expected cash flows and actual cash flows, the system allows Accounting for A First Party Owing the Expected Cash Flows to a Second Party 150, Accounting for the Second Party Owing the Actual Cash Flows to the First Party 152 and Computing a Net Settlement 154.

The computer system further Calculates the Impact of the Transaction on the Securitizing 218, and the Impact of the Transaction on Traunches for Securitizing 220 and then Determines the effect of said Transaction on a Securitization Pool 222. These processes incorporate the results of the transaction with the securitization pool and review the results of the securitization pool before and after incorporating the results of the transaction.

Blocks 142-144, 156-158, 216, 224-230, stores input data, processed data, and all data reflected in the processed model documents. These include Storing Selected Descriptions of Risks Associated with Individuals 216, Statistical Assumptions 142, Financial Assumptions 144, Expected Cash Flows reflecting Securitizing of Funding 224, Net Settlement 156 and Actual Cash Flows 158. Further included is Storing the Impact of Transaction on Securitizing 226, on Traunches for Securitizing 228 and on the Securitization Pool 230.

All these detailed processes are coded into the Computer System 32.

FIGS. 7-7f shows the logic of the processes in the representative general embodiment as applied more generally to Contractual Exposures 16. Receiving Respective Description of Risks 132 (see FIG. 4) involves Selecting Respective Descriptions Associated with Specific Contractual Exposures 184 (the choices are insurable risk coverage from individuals, insurable risk exposure to individuals, exposures from COLI, exposures from BOLI, corporate contractual exposures or exposures in a reinsurance treaty) and further Receiving Nominal Death Benefit Face Amounts 242. Block 132 also involves Selecting Respective Characteristics Associated with Individuals or a Group of Individuals 250 (Blocks 246 and 248 allowing for these choices) and further Receiving at least One Characteristic as Age, Sex, Mortality Rating, Morbidity Rating, Compensation, Position, Job class and Years of Service 244. By Block 250, the Contractual Exposures 16 would become specific to either individuals or group of individuals. The risk characteristics as coded into the system are reflective of whether the contractual exposures are for individuals or for a group of individuals. For a group of individuals, it is not uncommon to group the lives and then use an average risk characteristic such as a central average age or even a weighted average mortality rating.

These characteristics define the insurable risks and allows for the Selection of Specific Rates of Decrement 264 (in processes 256-262 the applicable rates of decrement to the risk exposures are identified for selection; general rates of decrement, those associated with insurable risk coverage of individuals, with insurable risk exposures to individuals and with a reinsurance treaty) and the further Receiving of Expected Mortality Rates 254 in the Receipt of Statistical Assumptions 134 (see FIG. 4).

The step Receipt of Financial Assumptions 136 (see FIG. 4) further includes receiving at least one of the following information, a Discount Rate, an Expense or a Fee 252. A discount rate is normally used in evaluating a current valuation of the risks, the cost and the fee. Expenses or fees associated with the transaction are also included in the valuations.

Next step is Receiving Data Identifying the Second Party 272, Data Identifying the Transaction Binding the Parties 270 and Data Identifying the Transaction as Having a Portion Renewable 268. These information complete transaction data reflected in the processed model documents.

Margins and Loadings are Incorporated in Developing Expected Mortality Rates 274 to Determine Expected Timing and Amount of Death Benefits 276 and Calculate Expected Cash Flows 138. Expected Timing and Expected Amount of Death Benefits are Tracked 280. With Receipt of Actual Cash Flows Information 148 and Receipt of Information on Actual Timing and Actual Amounts of Death Benefits 266, Actual Timing and Actual Amounts of Death Benefits are Tracked 282 as well. Further Accounting for a First Party Owing Expected Cash Flows 150, Accounting for the Second Party Owing the Actual Cash Flows 152, and Computing a Net Settlement, for each said Time Periods 154, Net Settlements are Tracked 284. Historical Records 286 are also maintained. Statistical methodologies are coded into the system. Expected rates of decrements are used in these methodologies. Valuations of expected results are also done by the system. Scenarios testing of actual results versus expected results are also evaluated. Then actual results with expected results are tracked.

The output Provides the Second Party with Documentation of Cash Flows 288, Illustration of a Transaction Fee from the Second Party to the First Party 290 and further illustrating said Transaction Fee Incorporated in the Net Settlement 292. An additional process is Accounting for the First Party Receiving a Fee for Early Termination of Transaction 294 to mitigate one party's ability to control whether termination takes place or not. All relevant financial data are illustrated to allow Second Party 4 to evaluate results and results to-date. Similarly for First Party 2.

Input data are updated regularly and as desired in Block 278. Blocks 206, 142-144, 300, 156-158, 296-298, 302-306, 308-324 allow for storing all input data and all processed data. These include selected descriptions of risks, statistical assumptions, financial assumptions, expected cash flows, net settlement and actual cash flows. For the descriptions of risks, further included are nominal death benefit face amounts, characteristics of risks such as mortality rating, and identification of whether risks are evaluated as individuals or as a group of individuals. Statistical assumptions are further defined with expected mortality rates and specific rates of decrement. Financial assumptions include at least a discount rate, an expense or a fee. Expected cash flows further include margins and loadings in the expected mortality rates, and expected timing and expected amounts of death benefits resulting from these mortality rates. Actual cash flows data include actual timing and actual amount of death benefits for each life. All corresponding historical information is also stored. Further stored are transaction data such as party with ownership rights to contractual exposures, binding contract and renewability of contract.

FIG. 8 shows the involvement of the inventors' network of computer systems as well as the computer systems of all interested and involved parties, Blocks 342-358. These are the computer systems for First Party 342, Second Party 344, Tax Advisors 346, Accounting Advisors 348, Marketing Advisors 350, Legal Advisors 352, Securitzation Pool 354, Other Consultants 356, and Regulatory Bodies 358. These interested and involved bodies include the inventors, the parties to the transaction, consultants and other bodies that provide input data to the transaction. Information shared among these bodies includes Financial Analysis Output 58 and Processed Model Documents 60.

FIG. 9 summarizes the representative general embodiment as a swap investment security Block 362. The swap investment security is similar to a catastrophe bond. The security will be in the form of a preferred stock or a subordinated debt such that the investment return of the investor will be a fixed-income return 364 plus or minus the results of the mortality swap Transaction 6 Building the Mortality Swap into a debt instrument will produce a security that resembles a Catastrophe Bond in the P&C market, but with the unique characteristics of life risk transfer. Like a Catastrophe Bond, insurance risk is transferred to a Capital Markets instrument; unlike Cat Bonds, the security holder has upside as well as downside insurance profit/loss potential, and the bond may be structured as a Surplus Note, providing Capital to an insurer who issues it.

The bond would be issued for cash for a specific term (or it could be a perpetual) and would pay a coupon rate, supported by the investment income on the cash, plus a mortality differential equal to expected mortality minus actual mortality. The differential could either be positive or negative and, if negative greater than the interest, it could invade the principle to a specified limit.

A variation that used some or all of early year positive results to build a "buffer" fund (which earned interest) might be used in more volatile-prone situations.

A second variation would be to pay a higher rate and only charge losses against the instrument, perhaps with a carry-forward of the loss to be recovered out of future mortality gains.

FIG. 10 outlines the initiation of the transaction for a representative embodiment. Second Party 2 provides Contractual Exposures Information 16 to allow first Party 2 to calculate Annual Expected Cash Flows Projections 10. Inherent in these expected cash flows are the results of Statistical Risk and Credibility Analyses 378; Calculation of Expected claims 380; Addition of Risk Margins 382 and Addition of Expenses and Profit Factors 384, commonly referred to as pricing loadings, all steps coded into the actuarial pricing system. For efficiency, accuracy and business credibility. when Second Party 4 accepts these terms of the deal, Preparation of the Deal Documents 386 is triggered in Actuarial Pricing System 45 and Transaction Contract 374 is presented by First Party 2 to Second party 4. else, the process of analyses, calculation of expected claims, addition of margins and loadings are repeated until the terms are acceptable to Second Party 4. If iterations of analyses of Contractual Exposures Information 16 does not result in Annual Expected Cash flows Projections 10 acceptable to Second Party 4, Transaction Not Closed Document 376 is produced in the process Prepares deal Documents 386 The codes into the Actuarial Pricing System 45 allows the efficient financial pricing of this transaction.

FIG. 11 highlights the process when there is an occurrence of events. An occurrence of events triggers reporting of Actual Cash Flow Information 8 from Second Party 4 to First Party 2. On the other hand, First Party 2 initiates some analyses for Validation of Pricing 392 in Actuarial Pricing System 45 as well as Updates of Data files 394, Updates of Information System 396 and Triggers Reporting If Any 398 in the Data Management Program.

FIG. 12 illustrates regular processes and is very similar to FIG. 1. However, FIG. 12 not only shows the flow of the Actual Cash Flow Information 8 from Second Party 2, Annual Expected Cash Flows Information 10 from First Party 2, the decision tree 14 of whether Actual Cash Flow Less Expected Cash Flow is Positive and then the corresponding flow of the Net settlement 12. Again as in FIG. 11 First Party 2 initiates some analyses for Validation of Pricing 392 in Actuarial Pricing System 45 as well as Updates of Data files 394, Updates of Information System 396 and Triggers Reporting If Any 398 in the Data Management Program.

There are an infinite number of variations due to the robust nature of that which is disclosed herein, but to summarize, embodiments can be viewed in accordance with particular applications, but one embodiment can be such as including the steps of entering into the computer the assumptions specific to the contractual exposures for the transaction, the data respecting the covered risks, and the pricing data reflecting risks and costs; entering the specific relationships of expected results to actual results, or the like, for example, either on a "proportional", "non-proportional", "symmetric", or "asymmetric" basis (es), which are to be the subject of the SWAP between a party and a counterparty; engaging the computer to calculate, summarize and report the periodic expected or projected results which are to be SWAPped; storing the data for periodic comparison to actual results; the periodically entering into the computer of actual results of the events subject to the SWAP; calculating the differences to produce a report of the net settlement between the party and the counterparty; and the historically tracking of the results for the duration of the transaction. The method reflecting (i) SWAP terms not being a generic index but being specific to the underlying plan, program, policies, or, in general, contractual exposures or contractual insurable risk exposures as well as to actual mortality and other benefit occurrences or events associated with the transaction; and (ii) the use of an actuarial pricing system for separately pricing each transaction. Indeed an embodiment can include the step of (or means for) incorporating the transaction into an other securities, for example, one or more bonds, preferred stocks, and financial options, and even a combination thereof. Another embodiment can include a method step of (means for) incorporating at least one said net settlement with at least one settlement of another other obligation arising from securities issued to carry out the transaction. Appreciation is requested for the robust range of possibilities flowing from the chore teaching herein.

More broadly, however, the terms and expressions which have been employed herein are used as terms of teaching and not of limitation, and there is no intention, in the use of such terms and expressions, of excluding equivalents of the features shown and described, or portions thereof, it being recognized that various modifications are possible within the scope of the embodiments contemplated and suggested herein. Further, various embodiments described and suggested herein. Although the disclosure herein has been described with reference to specific embodiments, the disclosures are intended to be illustrative and are not intended to be limiting. Various modifications and applications may occur to those skilled in the art without departing from the true spirit and scope of the invention as defined in the appended claims.

Thus, although only a few exemplary embodiments have been described in detail above, those skilled in the art will readily appreciate that many modifications are possible in the exemplary embodiments without materially from the novel teachings and advantages herein. Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

We claim:

1. Apparatus comprising:
   a computer system comprising a digital computer operably associated with an input device and with an output device, the computer programmed to carry out operations including:
   receiving, at the input device, input data corresponding to lives of individuals or a group of individuals, statistical risk assumptions associated with the lives of individuals or the group of lives, and specification of time periods associated with the lives of individuals or the group of lives for each of the time periods corresponding to the transaction;
   calculating, from the input data, the statistical assumptions, and the specification of time periods, expected cash flow corresponding to said risks for the time periods of a transaction which comprises a financial derivative;
   receiving, at the input device, actual cash flow information from occurrence of events corresponding to said time periods, said cash flows arising from at least one event of death, disability, and survivorship;
   producing a first accounting of a first party to the transaction owing the expected cash flow to a second party to the transaction, and producing a second accounting of the second party to the transaction owing the actual cash flow to the first party to the transaction; and
   outputting at least one of said first accounting, said second accounting, and a settlement, based on the expected cash flow and the actual cash flow for at least one of said time periods, so as to produce the output for the transaction at the output device.

2. The apparatus of claim 1, wherein the respective descriptions of risks include respective characteristics of said risks associated with contractual exposures from respective insurable risk coverage of the individuals or the group of individuals.

3. The apparatus of claim 1, wherein the respective descriptions of risks include respective characteristics of said risks associated with respective contractual insurable risk exposure to the individuals or the group of individuals.

4. The apparatus of claim 1, wherein the respective descriptions of risks include respective characteristics of said risks associated with contractual exposures from corporate-owned life insurance coverage of the individuals or the group of individuals.

5. The apparatus of claim 1, wherein the respective descriptions of risks includes respective characteristics of said risks associated with contractual exposures from bank-owned life insurance coverage of the individuals or the group of individuals.

6. The apparatus of claim 1, wherein the respective descriptions of risks include respective characteristics of said risks associated with corporate contractual benefit payment exposures to the individuals or the group of individuals.

7. The apparatus of claim 1, wherein the respective descriptions of risks include respective characteristics of said risks associated with contractual exposures in a reinsurance treaty.

8. The apparatus of claim 1, wherein calculating expected cash flows comprises processing said descriptions and said assumptions in calculating timing and amounts of benefits associated with said occurrence of events for the risks; and further comprising the operation of determining pricing so as to reflect said transaction as an exchange between said parties.

9. The apparatus of claim 8, wherein the pricing carries out a relationship between the expected cash flows and the actual cash flows reflecting a symmetric exchange of non-proportional contractual exposures.

10. The apparatus of claim 8, wherein the pricing carries out a relationship between the expected cash flows and the actual cash flows reflecting a symmetric exchange of proportional contractual exposures.

11. The apparatus of claim 8, wherein the pricing carries out a relationship between the expected cash flows and the actual cash flows reflecting an asymmetric exchange of proportional and non-proportional contractual exposures.

12. The apparatus of any one of claims 2-6, wherein the transaction comprises securitizing some or all of the contractual exposures.

13. The apparatus of claim 12, wherein the operations include calculating an impact of the transaction on the securitizing.

14. The apparatus of claim 13, wherein the operations include calculating an impact of the transaction on traunches for the securitizing.

15. The apparatus of claim 14, wherein the operations include determining an effect of said transaction on a securitization pool.

16. The apparatus of any one of claims 2-7, wherein the respective descriptions of risks includes nominal death benefit face amounts for said contractual exposures; and
   wherein the statistical assumptions include expected mortality rates; and
   wherein operations include incorporating margins and loadings in developing expected mortality rates for the transaction, and determining expected timing and expected amount of death benefits using said expected mortality rates and said characteristics of said risks associated with said contractual exposures.

17. The apparatus of any one of claims 2-7, wherein the transaction which comprises a financial derivative is carried out with the financial derivative embedded into a financial instrument.

18. The apparatus of claim 17, wherein the respective characteristics of risks associated with said lives of individuals or said group of individuals includes at least one characteristic from a group including age, sex, mortality rating, morbidity rating, compensation, position, job class, and years of service.

19. The apparatus of claim 1, wherein the statistical assumptions includes rates of decrement.

20. The apparatus of claim 1, wherein the statistical assumptions includes rates of decrement associated with insurable risk coverage of individuals.

21. The apparatus of claim 1, wherein the statistical assumptions includes rates of decrement associated with insurable risk exposures to the individuals or the group of individuals.

22. The apparatus of claim 1, wherein the statistical assumptions includes rates of decrement associated with a reinsurance treaty.

23. The apparatus of any one of claims 19-22, wherein the financial assumptions include at least one of a group comprising a discount rate, an expense, and a fee.

24. The apparatus of any one of claims 19-22, wherein the operations include updating at least one of a member of a group comprised of said descriptions, statistical assumptions, financial assumptions, and actual cash flows information from the occurrence of at least one of said events, sending the updated member to a second computer of the computer system, and receiving the updated member, at the second computer in carrying out the transaction.

25. The apparatus of claim 16, wherein the actual cash flows information from occurrence of events corresponding to said risks includes information on actual timing and actual amounts of death benefits, respectively for each of said individuals or for said group of individuals.

26. The apparatus of claim 25, wherein the operations further include tracking the expected timing and the expected amount of death benefits, respectively for each of said individuals or for said group of individuals, tracking the actual timing and the actual amounts of death benefits and tracking settlements for the time periods of the transaction.

27. The apparatus of claim 16, wherein the determining a settlement includes forming a historical record of the expected timing and the expected amount of death benefits, actual timing, and information on actual amounts of death benefits, respectively for each of said individuals or for said group of individuals, and each said net settlement for each of said time periods.

28. The apparatus of claim 16, wherein the operations include providing documentation of said cash flows for the second party and for illustrating a transaction fee from the second party to the first party.

29. The apparatus of claim 16, wherein the operations include accounting for the first party receiving a fee for early termination of transaction.

30. The apparatus of claim 16, wherein said information includes data identifying the second party as an entity having ownership rights to contractual exposures on more than one life of said individuals.

31. The apparatus of claims 16, wherein said information includes data identifying the transaction as pursuant to a contract binding the parties.

32. The apparatus of claim 31, wherein said information includes data identifying the transaction as having a portion renewable on a period-to-period basis.

33. The apparatus of claim 1, wherein the operations further include communicating to at least one other computer system, the communication comprised of at least one of a processed model document and financial analysis output, the other computer from a group including a first party computer system, a second party computer system, a tax advisor computer system, a accounting advisor computer system, a marketing advisor computer system, a legal advisor computer system, a securitization pool computer system, an other consultant computer system, and a regulatory body computer system, and receiving said communication at said at least one other computer system.

34. The apparatus of claim 1, wherein the operations further include providing statistical risk and credibility analyses, the analyses allowing the calculation of expected claims, the addition of risk margins and the additions of expenses and profit factors by successive iterations of the said process until a transaction is initiated.

35. The apparatus of claim 34, wherein the operations further include triggering validation of the initial pricing.

36. The apparatus of claim 1, wherein the operations further include incorporating at least some of the transaction into a security.

37. The apparatus of claim 26, wherein the operations further include incorporating at least one said settlement with at least one settlement of another obligation arising from a security issued to carry out the transaction.

38. A method of using an apparatus in carrying out a transaction which comprises a financial derivative, the method including the steps of:
   providing a computer operably associated with an input device and with an output device, the computer programmed to carry out the operations of:
   at said input device:
      receiving respective descriptions of risks;
      receiving statistical assumptions for said risks;
      receiving financial assumptions for said risks; and
      calculating, from the descriptions and the assumptions, expected cash flows corresponding to said risks for time periods;
   at said input device, receiving actual cash flows information from occurrence of events corresponding to said risks;
   accounting for a first party owing the expected cash flows to a second party and accounting for the second party owing actual cash flows to the first party, in computing a settlement, for each of said time periods, so as to manage the actual cash flows and the expected cash flows between the parties in carrying out a transaction which comprises a financial derivative; and
   outputting each said settlement corresponding to the transaction at said output device.

39. The method of claim 38, wherein the step of receiving respective descriptions of risks includes receiving respective characteristics of said risks associated with contractual exposures from respective insurable risk coverage of individuals or a group of individuals.

40. The method of claim 38, wherein the step of receiving respective descriptions of risks includes receiving respective characteristics of said risks associated with respective contractual insurable risk exposure to individuals or a group of individuals.

41. The method of claim 38, wherein the step of receiving respective descriptions of risks includes receiving respective characteristics of said risks associated with contractual exposures from corporate-owned life insurance coverage of individuals or a group of individuals.

42. The method of claim 38, wherein the step of receiving respective descriptions of risks includes receiving respective characteristics of said risks associated with contractual exposures from bank-owned life insurance coverage of individuals or a group of individuals.

43. The method of claim 38, wherein the step of receiving respective descriptions of risks includes receiving respective characteristics of said risks associated with corporate contractual benefit payment exposures to individuals or a group of individuals.

44. The method of claim 38, wherein the step of receiving respective descriptions of risks includes receiving respective characteristics of said risks associated with contractual exposures in a reinsurance treaty.

45. The method of claim 38, wherein the step of calculating expected cash flows includes the step of processing said descriptions and said assumptions in calculating timing and amounts of benefits associated with said occurrence of events for the risks; and further including receiving pricing data reflecting said transaction as an exchange between said parties; and wherein the step of computing the settlement is responsive to said exchange between the parties.

46. The method of claim 45, wherein the step of inputting pricing data includes the step of:
inputting a definition of a relationship between the expected cash flows and the actual cash flows reflecting a symmetric exchange of non-proportional contractual exposures.

47. The method of claim 45, wherein the step of inputting pricing data includes the step of:
inputting a definition of a relationship between the expected cash flows and the actual cash flows reflecting a symmetric exchange of proportional contractual exposures.

48. The method of claim 45, wherein the step of inputting pricing data includes the step of:
inputting a definition of a relationship between the expected cash flows and the actual cash flows reflecting an asymmetric exchange of proportional and non-proportional contractual exposures.

49. The method of any one of claims 39-43, further including the steps of:
receiving financial information on securitizing of funding for the contractual exposures; and
processing the financial information on securitizing to implement securitization of the funding.

50. The method of claim 49, further including the step of calculating an impact of the transaction on the securitizing.

51. The method of claim 50, further including the step of calculating the impact of the transaction on tranches for the securitizing.

52. The method of claim 51, further including the step of determining an effect of said transaction on a securitization pool.

53. The method of any one of claims 39-44, wherein the step of receiving respective descriptions of risks includes receiving nominal death benefit face amounts for said contractual exposures; and
wherein the step of receiving statistical assumptions includes receiving expected mortality rates; and further including the steps of:
incorporating margins and loadings in developing expected mortality rates for the transaction; and
determining expected timing and expected amount of death benefits using said expected mortality rates and said characteristics of said risks associated with said contractual exposures.

54. The method of any one of claims 39-44, wherein the step of receiving respective descriptions of risks includes receiving respective characteristics of said risks associated with at least one member of a group consisting of a plurality of individuals and a group of individuals.

55. The method of claim 54, wherein the step of receiving respective characteristics of risks associated with said member of the group includes receiving at least one characteristic from a group consisting of age, sex, mortality rating, morbidity rating, compensation, position, job class, and years of service.

56. The method of claim 38, wherein the step of receiving statistical assumptions includes receiving rates of decrement.

57. The method of claim 38, wherein the step of receiving statistical assumptions includes receiving rates of decrement associated with insurable risk coverage of individuals.

58. The method of claim 38, wherein the step of receiving statistical assumptions includes receiving rates of decrement associated with insurable risk exposures to individuals.

59. The method of claim 38, wherein the step of receiving statistical assumptions includes receiving rates of decrement associated with a reinsurance treaty.

60. The method of any one of claims 56-59, wherein the step of receiving financial assumptions includes receiving at least one of a group consisting of a discount rate, an expense, and a fee.

61. The method of any one of claims 56-59, further including the step of updating at least one of a member of a group consisting of said descriptions, said statistical assumptions, said financial assumptions, and said actual cash flows information from the occurrence of at least one of said events.

62. The method of claim 53, wherein the step of
receiving actual cash flows information from occurrence of events corresponding to said risks includes receiving information on actual timing and actual amount of death benefits, respectively for each of said individuals.

63. The method of claim 62, further including:
tracking the expected timing and the expected amount of death benefits, respectively for each of said individuals;
tracking the actual timing and the actual amount of death benefits; and
tracking the settlements for the time periods of the transaction.

64. The method of claim 63, further including forming a historical record of the expected timing and the expected amounts of death benefits, the actual timing and the actual amount of death benefits, respectively for each of said individuals, and each said settlement for each of said time periods.

65. The method of claim 63, further including the steps of:
providing the second party with documentation of said cash flows; and
illustrating a transaction fee from the second party to the first party, including illustrating said transaction fee incorporated in the settlement.

66. The method of claim 63, further including the step of:
accounting for the first party receiving a fee for early termination of the transaction.

67. The method of claim 63, further including the step of receiving data identifying the second party as an entity having ownership rights to said contractual exposures, and said contractual exposures are on more than one life of said individuals.

68. The method of claim 63, further including the step of receiving data identifying the transaction as pursuant to a contract binding the parties.

69. The method of claim 68, further including the step of receiving data identifying the transaction as having a portion renewable on a period-to-period basis.

70. Apparatus comprising:
a computer system comprising a digital computer operably associated with an input device and with an output device, the computer programmed to implement the operations of:
receiving respective descriptions of risks;
receiving statistical assumptions for said risks;
receiving financial assumptions for said risks;
calculating, from the descriptions and the assumptions, expected cash flows corresponding to said risks for time periods;
receiving actual cash flows information from occurrence of events corresponding to said risks; and
accounting for a first party to a transaction owing the expected cash flows to a second party and accounting for the second party owing actual cash flows to the first party in computing to produce a settlement based on the expected cash flows and the actual cash flows, for each of said time periods in the transaction to manage the actual cash flows and the expected cash flows between the parties in the transaction which comprises the financial derivative; wherein said settlement is output at said output device.

71. The apparatus of claim 70, wherein the receiving respective descriptions of risks includes receiving respective characteristics of said risks associated with contractual exposures from respective insurable risk coverage of individuals.

72. The apparatus of claim 70, wherein the receiving respective descriptions of risks includes receiving respective characteristics of said risks associated with respective contractual insurable risk exposure to individuals.

73. The apparatus of claim 70, wherein the receiving respective descriptions of risks includes receiving respective characteristics of said risks associated with contractual exposures from corporate-owned life insurance coverage of individuals.

74. The apparatus of claim 70, wherein the receiving respective descriptions of risks includes receiving respective characteristics of said risks associated with contractual exposures from bank-owned life insurance coverage of individuals.

75. The apparatus of claim 70, wherein the receiving respective descriptions of risks includes receiving respective characteristics of said risks associated with corporate contractual benefit payment exposures to individuals.

76. The apparatus of claim 70, wherein the receiving respective descriptions of risks includes receiving respective characteristics of said risks associated with contractual exposures in a reinsurance treaty.

77. The apparatus of claim 70, wherein the calculating expected cash flows includes processing said descriptions and said assumptions in calculating timing and amounts of benefits associated with said occurrence of events for the risks; further comprising the operation of receiving pricing data reflecting said transaction as an exchange between said parties; and wherein the computing the settlement is responsive to said pricing data.

78. The apparatus of claim 77, wherein the receiving pricing data includes the operation of:
receiving a definition of a relationship between the expected cash flows and the actual cash flows reflecting a symmetric exchange of non-proportional contractual exposures.

79. The apparatus of claim 77, wherein the receiving pricing data includes the operation of:
receiving a definition of a relationship between the expected cash flows and the actual cash flows reflecting a symmetric exchange of proportional contractual exposures.

80. The apparatus of claim 77, wherein the receiving pricing data includes the operation of:
receiving a definition of a relationship between the expected cash flows and the actual cash flows reflecting an asymmetric exchange of proportional and non-proportional contractual exposures.

81. The apparatus any one of claims 71-76, further including the operation of processing responsive to data reflecting securitizing of funding for the contractual exposures.

82. The apparatus of claim 81, further including the operation of calculating impact of the transaction on the securitizing.

83. The apparatus of claim 82, further including the operation of calculating the impact of the transaction on tranches for the securitizing.

84. The apparatus of claim 83, further including the operation of determining an effect of said transaction on a securitization pool.

85. The apparatus of any one of claims 71-76, wherein the receiving respective descriptions of risks includes receiving nominal death benefit face amounts for said contractual exposures; and
wherein the receiving statistical assumptions includes receiving expected mortality rates; and further including the operations of:
incorporating margins and loadings in developing expected mortality rates for the transaction; and
determining expected timing and expected amount of death benefits using said expected mortality rates and said characteristics of said risks associated with said contractual exposures.

86. The apparatus of any one of claims 71-76, wherein the receiving respective descriptions of risks includes receiving respective characteristics of said risks associated with at least one member of a group consisting of a plurality of individuals and a group of individuals.

87. The apparatus of claim 85, wherein the receiving respective characteristics of risks associated with said member of the group includes receiving at least one characteristic of age, sex, mortality rating, morbidity rating, compensation, position, job class, and years of service.

88. The apparatus of claim 70, wherein the receiving statistical assumptions includes receiving rates of decrement.

89. The apparatus of claim 70, wherein the receiving statistical assumptions includes receiving rates of decrement associated with insurable risk coverage of individuals.

90. The apparatus of claim 70, wherein the receiving statistical assumptions includes receiving rates of decrement associated with insurable risk exposures to individuals.

91. The apparatus of claim 70, wherein the receiving statistical assumptions includes receiving rates of decrement associated with a reinsurance treaty.

92. The apparatus of any one of claims 70-91, wherein the receiving financial assumptions includes receiving at least one of a discount rate, an expense, and a fee.

93. The apparatus of any one of claims 70-91, further including the operation of updating at least one of said descriptions, said statistical assumptions, said financial assumptions, and said actual cash flows information from the occurrence of at least one of said events.

94. The apparatus of claim 85, wherein the receiving actual cash flows information from occurrence of events corresponding to said risks includes receiving information on actual timing and actual amount of death benefits, respectively for each of said individuals.

95. The apparatus of claim 94, further including the operations of:
tracking the expected timing and the expected amount of death benefits, respectively for each of said individuals;
tracking the actual timing and the actual amount of death benefits; and
tracking settlements for the time periods of the transaction.

96. The apparatus of claim 94, wherein the computing a net settlement includes forming a historical record of the expected timing and the expected amount of death benefits, the actual timing and the actual amount of death benefits, respectively for each of said individuals, and each said settlement for each of said time periods.

97. The apparatus of claim 85, further including the operations of:
providing, to a computer of the second party, documentation of said cash flows; and illustrating a transaction fee from the second party to the first party, including illustrating said transaction fee incorporated in the settlement.

98. The apparatus of claim 85, further including the operation of accounting for the first party receiving a fee for early termination of the transaction.

99. The apparatus of claim 85, further including the operation of receiving data identifying the second party as an entity having ownership rights to the contractual exposures and wherein said contractual exposures are on more than one of life of said individuals.

100. The apparatus of claim 85, further including the operation of receiving data identifying the transaction as pursuant to a contract binding the parties, and processing responsive to said data identifying the transaction.

101. The apparatus of claim 90, further including the operation of receiving data identifying the transaction as having a portion renewable on a period-to-period basis.

102. Apparatus comprising:
  a computer system comprising a digital computer operably associated with an input device and with an output device, the computer programmed to implement the operations of:
  receiving respective descriptions of risks associated with contractual exposures from respective insurable coverage of individuals;
  receiving statistical assumptions for said risks;
  receiving financial assumptions for said risks;
  calculating, from the descriptions and the assumptions, expected cash flows corresponding to said risks for time periods;
  receiving cash flows information arising from occurrence of at least one of disability, and survivorship corresponding to said risks;
  accounting for a first party owing the expected cash flows to a second party and accounting for the second party owing actual cash flows to the first party in computing a settlement based on the expected cash flows and the actual cash flows, for each of said time periods, between the parties in carrying out a transaction which comprises a financial derivative.

103. The apparatus of claim 102, wherein the calculating expected cash flows includes processing said descriptions and said assumptions in calculating timing and amounts of benefits associated with said occurrence, and the computing the settlement comprises computing the settlement as a symmetric exchange of non-proportional contractual exposures.

104. The apparatus of claim 102, wherein the calculating expected cash flows includes processing said descriptions and said assumptions in calculating timing and amounts of benefits said occurrence, and the computing the settlement comprises computing the settlement as a symmetric exchange of proportional contractual exposures.

105. The apparatus of claim 102, wherein the calculating expected mortality cash flows includes processing said descriptions and said assumptions in calculating timing and amounts of benefits associated with said occurrence, and the computing the settlement comprises computing the settlement as an asymmetric exchange of proportional and non-proportional contractual exposures.

106. The apparatus of any one of claims 70-80, 88-91, 102-105, wherein the computer system includes a second digital computer, said computers cooperating to carry out the transaction.

107. Apparatus comprising:
  a computer apparatus to interact with a computer system comprising a digital computer operably associated with an input device and with an output device, the computer programmed to produce financial analysis output corresponding to a transaction comprising a financial derivative, by operations including:
  receiving, at the input device, input data corresponding to lives of individuals or a group of individuals, statistical risk assumptions associated with the lives of individuals or the group of lives, and specification of time periods associated with the lives of individuals or the group of lives for each of the time periods corresponding to the transaction;
  calculating, from the input data, the statistical assumptions, and the specification of time periods, expected cash flow corresponding to said risks for the time periods of said transaction;
  receiving, at the input device, actual cash flow information from occurrence of events corresponding to said time periods, said cash flows arising from at least one event of death, disability, and survivorship;
  producing a first accounting of a first party to the transaction owing the expected cash flow to a second party to the transaction, and producing a second accounting of the second party to the transaction owing the actual cash flow to the first party to the transaction; and
  outputting at least one of said first accounting, said second accounting, and a settlement, based on the expected cash flow and the actual cash flow for at least one of said time periods, so as to produce the financial analysis output for the financial derivative transaction at the output device; and wherein the computer apparatus is configured to receive, over a network, the financial analysis output and comprises a first party computer, a second party computer, a tax advisor computer, an accounting advisor computer, a marketing advisor computer, a legal advisor computer, a securitization pool computer, a consultant computer, or a regulatory body computer, and wherein the transaction is carried out corresponding to the financial analysis output.

108. Apparatus comprising:
  a computer apparatus to interact with a computer system comprising a digital computer operably associated with an input device and with an output device, the computer programmed to produce processed model document output corresponding to a transaction comprising a financial derivative, by operations including:
  receiving, at the input device, input data corresponding to lives of individuals or a group of individuals, statistical risk assumptions associated with the lives of individuals or the group of lives, and specification of time periods associated with the lives of individuals or the group of lives for each of the time periods corresponding to the transaction;
  calculating, from the input data, the statistical assumptions, and the specification of time periods, expected cash flow corresponding to said risks for the time periods of said transaction;
  receiving, at the input device, actual cash flow information from occurrence of events corresponding to said time periods, said cash flows arising from at least one event of death, disability, and survivorship;
  producing a first accounting of a first party to the transaction owing the expected cash flow to a second party to the transaction, and producing a second accounting of the second party to the transaction owing the actual cash flow to the first party to the transaction; and
  outputting at least one of said first accounting, said second accounting, and a settlement, based on the expected cash flow and the actual cash flow for at least one of said time periods, so as to produce as the processed model document output corresponding to the financial derivative transaction at the output device; and wherein the computer apparatus is configured to receive, over a network, the processed model document output and comprises a first party computer, a second party computer, a first party computer, a second party computer, a tax advisor computer, an accounting advisor computer, a marketing advisor computer, a legal advisor computer, a securitization pool computer, a consultant computer, or a regulatory body computer, and wherein the transaction is carried out according to the processed model document.

109. The apparatus of any one of claims 107, 108, wherein the financial derivative is embedded in a financial instrument.

110. An apparatus comprising:
a computer system comprising a digital computer operably associated with an input device and with an output device, the computer programmed to produce output corresponding to a transaction which comprises a financial derivative embedded into a financial instrument, the output data including documentation of the financial instrument, by operations including:
receiving, at the input device, input data corresponding to lives of individuals or a group of individuals, statistical risk assumptions associated with the lives of individuals or a group of individuals, and specification of time periods associated with the lives of individuals or a group of individuals for each of the time periods corresponding to the transaction;
calculating, from the input data, the statistical assumptions, and the specification of time periods, expected cash flow corresponding to said risks for the time periods of said transaction;
receiving, at the input device, actual cash flow information from occurrence of events corresponding to said time periods, said cash flows arising from at least one event of death, disability, and survivorship;
producing a first accounting of a first party to the transaction owing the expected cash flow to a second party to the transaction and producing a second accounting of the second party to the transaction owing the actual cash flow to the first party to the transaction in computing at least one of said first accounting, said second accounting, and a settlement computed based on the expected cash flow and the actual cash flow, for each of said time periods, between the parties in the transaction so as to produce documentation of the financial derivative embedded into the financial instrument; and
outputting, at said output device, output data comprising the documentation of the financial instrument.

111. The apparatus of any one of claims 2, 3, 6, 7, wherein:
the respective descriptions of risks includes nominal benefit amounts from at least one event of death, survivorship, and disability for said contractual exposures and the statistical assumptions correspondingly include at least one of expected mortality rates, expected survivorship rates and expected disability rates; and
the operations further include:
incorporating margins and loadings in producing said at least one of said expected rates; and
determining expected timing and expected amount of benefits using said at least one of said rates and said characteristics of said risks associated with said contractual exposures.

112. The apparatus of claim 1, wherein the operations further include processing which incorporates at least one said settlement with at least one settlement of another obligation arising from a security issued to carry out the transaction.

113. The apparatus of any one of claims 36, 112, wherein the operations further include incorporating into said security a profit or loss potential of the transaction plus a fixed return.

114. The apparatus of any one of claims 36, 112, wherein the operations further include incorporating into said security a loss potential of the transaction plus a fixed return with the option to carry forward losses and recover.

115. The apparatus of any one of claims 1, 70, 102, 107, 108, 110, wherein the operations further include processing which associates a transaction result with a bond.

116. The apparatus of any one of claims 1, 70, 102, 107, 108, 110, wherein the operations further include processing which associates a transaction result with a preferred stock.

117. The apparatus of any one of claims 1, 70, 102, 107, 108, 110, wherein the operations further include processing which associates a transaction result with a debt instrument.

118. The apparatus of any one of claims 1, 70, 102, 107, 108, 110, wherein the operations further include processing which associates a transaction result with a subordinated debt financial instrument.

* * * * *